(12) United States Patent
Carter et al.

(10) Patent No.: US 11,507,731 B2
(45) Date of Patent: Nov. 22, 2022

(54) SYSTEMS AND METHODS OF GENERATING A WEBSITE

(71) Applicant: CANVA PTY LTD., Surry Hills (AU)

(72) Inventors: Matthew Carter, Wollstonecraft (AU); Cameron Adams, Rozelle (AU); Eugene Datsky, Cammeray (AU); Tomasz Modrzyński, Zetland (AU); Georgia Vidler, Bondi Beach (AU)

(73) Assignee: CANVA PTY LTD, Surry Hills (AU)

( * ) Notice: Subject to any disclaimer, the term of this patent is extended or adjusted under 35 U.S.C. 154(b) by 0 days.

(21) Appl. No.: 16/393,860

(22) Filed: Apr. 24, 2019

(65) Prior Publication Data
US 2020/0342049 A1 Oct. 29, 2020

(51) Int. Cl.
*G06F 16/958* (2019.01)
*G06F 16/957* (2019.01)
*G06F 17/00* (2019.01)
*G06F 40/14* (2020.01)
*G06F 3/0484* (2022.01)

(52) U.S. Cl.
CPC ............ *G06F 40/14* (2020.01); *G06F 3/0484* (2013.01); *G06F 16/986* (2019.01)

(58) Field of Classification Search
CPC ...... G06F 40/14; G06F 16/986; G06F 3/0484; G06F 40/143; G06F 16/958; G06F 16/9577
USPC .................................................. 715/234, 200
See application file for complete search history.

(56) References Cited

U.S. PATENT DOCUMENTS

| | | | | |
|---|---|---|---|---|
| 6,185,587 B1* | 2/2001 | Bernardo | ................ | G06F 40/14 715/234 |
| 6,263,352 B1* | 7/2001 | Cohen | ..................... | G06F 40/10 715/206 |
| 6,684,369 B1* | 1/2004 | Bernardo | ............. | G06F 40/117 715/205 |
| 8,352,854 B2* | 1/2013 | Nazem | .................. | G06F 40/166 715/234 |
| 9,031,988 B2* | 5/2015 | Tymoshenko | .... | G06F 17/30896 707/791 |
| 10,846,357 B2* | 11/2020 | Dickerson | ............. | G06F 16/972 |

(Continued)

OTHER PUBLICATIONS

Hubspot, Welcome to Canva, published Nov. 30, 2016 via wayback machine, pp. 1-18 (pdf).*

(Continued)

*Primary Examiner* — Manglesh M Patel
(74) *Attorney, Agent, or Firm* — GrowIP Law Group LLC

(57) ABSTRACT

An apparatus includes an input interface, a processor, and a transmitter. The input interface is configured to receive user input associated with a design and to receive a user request indicating a selection of a website type of a plurality of website types. The processor is configured to update the design based on the user input. The updated design includes one or more design pages. The processor is configured to select, based on the website type, a specific set of website generation tasks. The processor is configured to perform the specific set of website generation tasks to generate one or more webpages of a website of the website type. The webpages correspond to the design pages. The transmitter is configured to send a web output to at least one of a data storage device, a publishing endpoint, or a client device. The web output corresponds to the webpages.

23 Claims, 18 Drawing Sheets

(56) References Cited

U.S. PATENT DOCUMENTS

| | | | |
|---|---|---|---|
| 11,068,559 B2* | 7/2021 | Dickerson | G06F 40/186 |
| 2006/0248442 A1* | 11/2006 | Rosenstein | G06F 16/9577 |
| | | | 715/205 |
| 2007/0106597 A1* | 5/2007 | Singh | G06Q 40/04 |
| | | | 705/37 |
| 2007/0162845 A1* | 7/2007 | Cave | G06F 40/117 |
| | | | 715/209 |
| 2007/0220419 A1* | 9/2007 | Stibel | G06F 16/958 |
| | | | 715/234 |
| 2007/0240037 A1* | 10/2007 | Law-How-Hung | |
| | | | G06F 3/0482 |
| | | | 707/E17.116 |
| 2007/0299986 A1* | 12/2007 | Craig | H04L 61/30 |
| | | | 707/E17.116 |
| 2013/0332819 A1* | 12/2013 | Avritch | G06Q 30/02 |
| | | | 715/234 |
| 2014/0281907 A1* | 9/2014 | Baldwin | G06F 40/143 |
| | | | 715/234 |
| 2019/0228104 A1* | 7/2019 | Dickerson | G06F 40/186 |
| 2021/0303654 A1* | 9/2021 | Dickerson | G06F 16/972 |

OTHER PUBLICATIONS

"Integrating with Other Libraries," React, reactjs.org, Facebook Open Source, <https://reactjs.org/docs/integrating-with-other-libraries.html>, retrieved on Apr. 23, 2019, Copyright 2019, Facebook Inc., 14 pages.

* cited by examiner

SYSTEMS AND METHODS OF GENERATING A WEBSITE

BACKGROUND

With the proliferation of the internet, there are often many ways to receive information online. For example, some people may keep informed on the daily news by visiting a news organization's website, while others may use social media networks and messaging fees, and while still others may rely on internet message boards. There is increasing demand for content providers to make the same content available via multiple online platforms, where different platforms may have different constraints in terms of article lengths, image sizes, hyperlink availability, etc. The devices used by people to visit online platforms may similarly vary in capability. Recreating content on an individual basis for each of multiple online platforms and/or types of user devices may require a large amount of effort. Further, the difficulty in maintaining consistency across the various platforms and user devices may lead to inconsistencies between the various platforms and devices.

DETAILED DESCRIPTION

Figure 1:
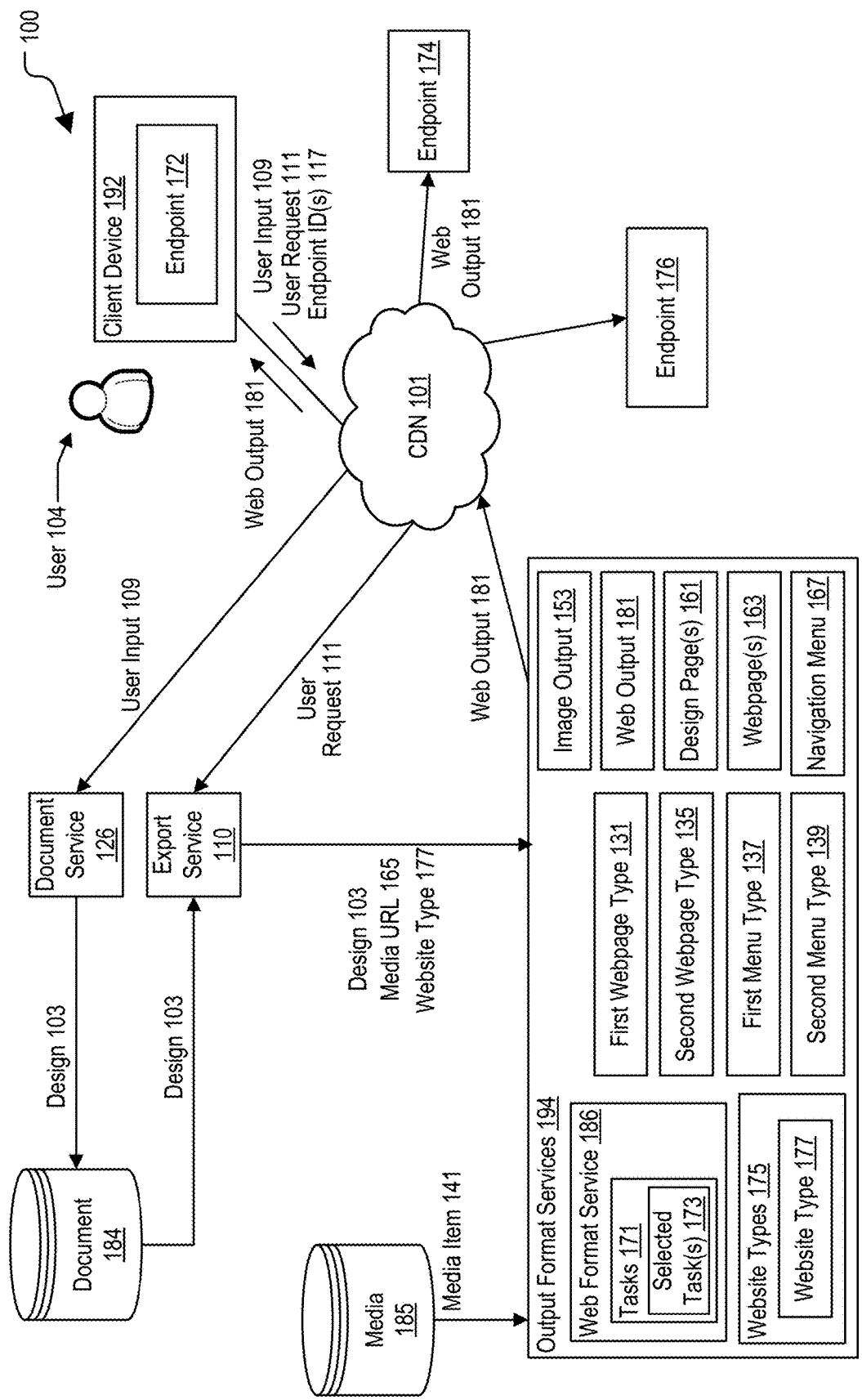
FIG. 1 illustrates a particular example of a system that is operable to generate a website.

Websites are a popular platform for presenting content on the internet. Websites may typically be referred to by a domain name and may present various webpages that are navigable, for example via hyperlinks. In accordance with particular embodiments of the present disclosure, one or more different websites may automatically, and in some cases at least partially concurrently, be generated based on a design created by a user. As used herein, a "design" may include image content (e.g., in vector format or pixel format), text content, formatting information (e.g., colors, fonts, etc.), etc. In accordance with the described techniques, when a user (who may not be a graphic designer or other visual arts professional) publishes a design to a website, web output is generated based on the design. In some example, the user only provides basic input regarding the type of website(s) desired, and the disclosed system determines which individual website generation tasks are to be executed, and in what order, to generate the website having the desired website type.

To illustrate, a user may elect to generate one or more different types of websites from a five-page design document, where each page has various media and/or text content. When the user indicates that the design should be published to a "classic" website type, web output generated based on the design may correspond to (e.g., include) five separate webpages, each webpage corresponding to a respective page of the design. The "classic" website type may also include a navigation menu having items that are selectable to navigate between the various webpages. As another example, a "scroll" website type may include a single webpage and scroll element(s) that enables scrolling to various portions of the webpage, where each portion corresponds to a respective page of the five-page design from which the website was automatically generated. It is to be understood that the various website types, including but not limited to the "classic" and "scroll" types, are for illustration only and not to be considered limiting. The techniques of the present disclosure may be used to automatically generate websites of additional and/or alternative website types than those described herein.

Certain website generation tasks may be common across website types, whereas other tasks may be specific to particular website types. To illustrate, a task that generates a web-compatible image from a design document may be used when generating both classic websites as well as scroll website. On the other hand, a task that generates a navigation menu may be used when generating classic websites but may not be used when generating scroll websites. Each task may be implemented by dedicated hardware devices or circuits, by discrete software modules, functions, or services, or some combination thereof. Thus, according to various aspects, responsive to a user selecting a particular website type, specific website generation tasks may be identified and a sequence for executing the tasks may be determined (in some cases certain tasks may be executed at least partly in parallel while tasks having dependencies may be executed one after the other). In an example, for the classic website type, the website generation tasks may include generating multiple webpages and a navigation menu with items that are selectable to navigate between the webpages. As another example, for the scroll website type, the website generation tasks may include generating a single webpage, including a customized scroll element that is operable to view various portions of the webpage (while potentially hiding other portions of the webpage).

The identified and scheduled website generation tasks may be performed to generate the desired type(s) of website, including one or more webpages corresponding to the design (or at least portions thereof, such as individual pages. Web output (e.g., the generated webpages) may be sent to a client device for the user to view. Alternatively, or in addition, the web output may automatically be uploaded to one or more web servers and/or a cloud infrastructure, from where the automatically generated website(s) may be accessed by the user and by other website visitors. Should the user desire to make a modification, the modification (or at least a version thereof) may need to be made to each of the generated websites. In accordance with the present disclosure, instead of modifying the websites individually, the user may instead modify the underlying design document once, and then republish the design while selecting the same website types. Alternatively, the modification may automatically be detected and updated web outputs reflecting the modification may automatically be propagated to the earlier-published websites. The modification may be implemented in a fashion that is appropriate to each selected website type, such that consistency of certain content attributes is maintained across the website types. As explained herein, when an intuitive drag-and-drop web design interface is provided, modifying the underlying design document may be easier and faster than modifying each website type, especially when the user is unfamiliar with web programming and publication tools.

It will thus be appreciated that the systems and methods disclosed herein may enable faster web design processes and a more intuitive user experience. For example, the user may efficiently generate various types of websites that are consistent with an underlying design without having to generate a targeted design for each type of website. Additional illustrative, non-limiting advantages of the present disclosure are described herein.

Aspects of the present disclosure may be described in conjunction with a graphic design website that enables users to create designs using web application(s) or other Software-as-a-service (SaaS) components. Alternatively, a mobile app may be used, where the application serves as a front-end for the design functionality offered by the web application(s) or other SaaS components. Examples of graphic designs include, but are not limited to, social media posts or headers, presentations, letterheads, magazine layouts, certificates, resumes, flyers, book/album covers or art, infographics, flyers, posters, menus, business cards, brochures, logos, greeting cards, postcards, invitations, collages, announcements, blog graphics, Internet advertisements, videos, animations, etc. In some examples, the graphic design website can be accessed by using Internet browsers and/or an application installed on a mobile device, such as a mobile phone or tablet. Unless specified otherwise, reference to the "graphic design website" herein includes the functionality accessible using the graphic design web application(s)/SaaS component(s) accessible via the graphic design website or the mobile app. Use of the graphic design website to create and modify designs may be faster and/or more convenient than using a standalone downloaded/purchased software program. However, it is to be understood that the description of website-based aspects herein is for illustration only and is not to be considered limiting. In alternative implementations, the techniques of the present disclosure may be applied in the context of a standalone computer application executed on a desktop computer, a laptop computer, a mobile device, etc.

When a user creates a new design on the graphic design website, the user may start with a blank design or may start from a design template that has a pre-applied layout. As used herein, a "layout" includes a default template of images, colors, and/or fonts. For example, the graphic design website may provide access to several "holiday greeting card" layouts, and a user may select one of the layouts as a starting point from which to customize their own holiday greeting card by uploading photos of their own family, entering a personalized greeting message, changing the images/fonts/colors included in the pre-applied layout, etc.

To provide a more comprehensive design experience, the graphic design website may enable the user to search for images, layouts, fonts, etc., as described above. To illustrate, the user may enter the search term "dog" to search for stock images of dogs that can be inserted into a design, pre-existing layouts featuring images and/or text about dogs, previously stored designs (by that user or by other users) featuring dogs, or any combination thereof. Incorporating a search result image (e.g., a photo of a dog) into a design may be as simple as "dragging-and-dropping" the image into the design, at which point the user may be free to edit the image in terms of size, color, etc. Certain media assets (e.g., images, layouts, fonts, etc.) may be free to incorporate into designs while others may be available for a price and may have an associated license (e.g., a one-time-use license) that is enforced by the graphic design website.

The graphic design website may enable the user to publish a single-page or multi-page design as a website. For example, the user may select a publish option to generate a web output corresponding to a particular type of website. Examples of website types are further described herein and may include, but are not limited to, "classic," "scroll," "presentation," and "standard."

An illustrative example of a system that supports operation of such a graphic design website and that is operable to publish a design as a website is shown in FIG. 1 and is generally designated 100. The system 100 includes a client device 192 that is communicably coupled, via a content delivery network (CDN) 101, to a computing environment (e.g., a network-accessible cloud computing environment). For example, the client device 192 is communicatively coupled to a document service 126, an export service 110, or both, of the computing environment. Although FIG. 1 shows a CDN 101, it is to be understood that in alternative aspects devices shown in FIG. 1 may communicate using one or more networks (or portions thereof) that include but are not limited to CDN(s), private network(s), cellular network(s), the Internet, etc. The client device 192 is configured to be operated by a user 104. As further described herein, the system 100 may enable the user 104 to quickly and easily create and edit various forms of graphic designs and other visual media works, even if the user 104 is not a trained graphic designer or other visual arts professional. In some examples, the computing environment includes one or more servers and/or one or more databases, data stores, and/or data storage devices. For example, the computing environment includes a document database 184, a media database 185, or both. The computing environment may include additional databases, such as an export database. The computing environment may include one or more load balancers, as further described with reference to FIG. 17.

In particular aspects, the client device 192 corresponds to a desktop computer, a laptop computer, a mobile phone, a tablet, or other computing device configured to access websites via the Internet. The client device 192 may include (or may be connected to) one or more input devices (e.g., a keyboard, a mouse, a touchscreen, etc.) and one or more output devices (e.g., a monitor, a touchscreen, audio speakers, a headphone connection, etc.).

In particular aspects, the client device 192, the computing environment, the one or more servers, the document database 184, the media database 185, the export database, the load balancers, or a combination thereof may include one or more processors or processing logic, memories, and/or network interfaces. The memories may include instructions executable by the processors to perform various functions as described herein. The network interfaces may include wired and/or wireless interfaces operable to enable communication to local area networks (LANs) and/or wide area networks (WANs), such as the Internet.

A first server may be configured to execute a web front end configured to serve a graphic design website to requestors. For example, the web front end may send one or more graphical user interfaces (GUIs) to the client device 192 in response to receiving a request from the client device 192. The same or a different (e.g., a second) server may be configured to execute the document service 126. The document service 126 may enable core design creation, design updating, and design deletion functionality of the graphic design website. The same or a different (e.g., the second or a third) server may be configured to execute the export service 110. The export service 110 may support graphic design export tasks (e.g., publishing a design as a web output).

Figure 2:
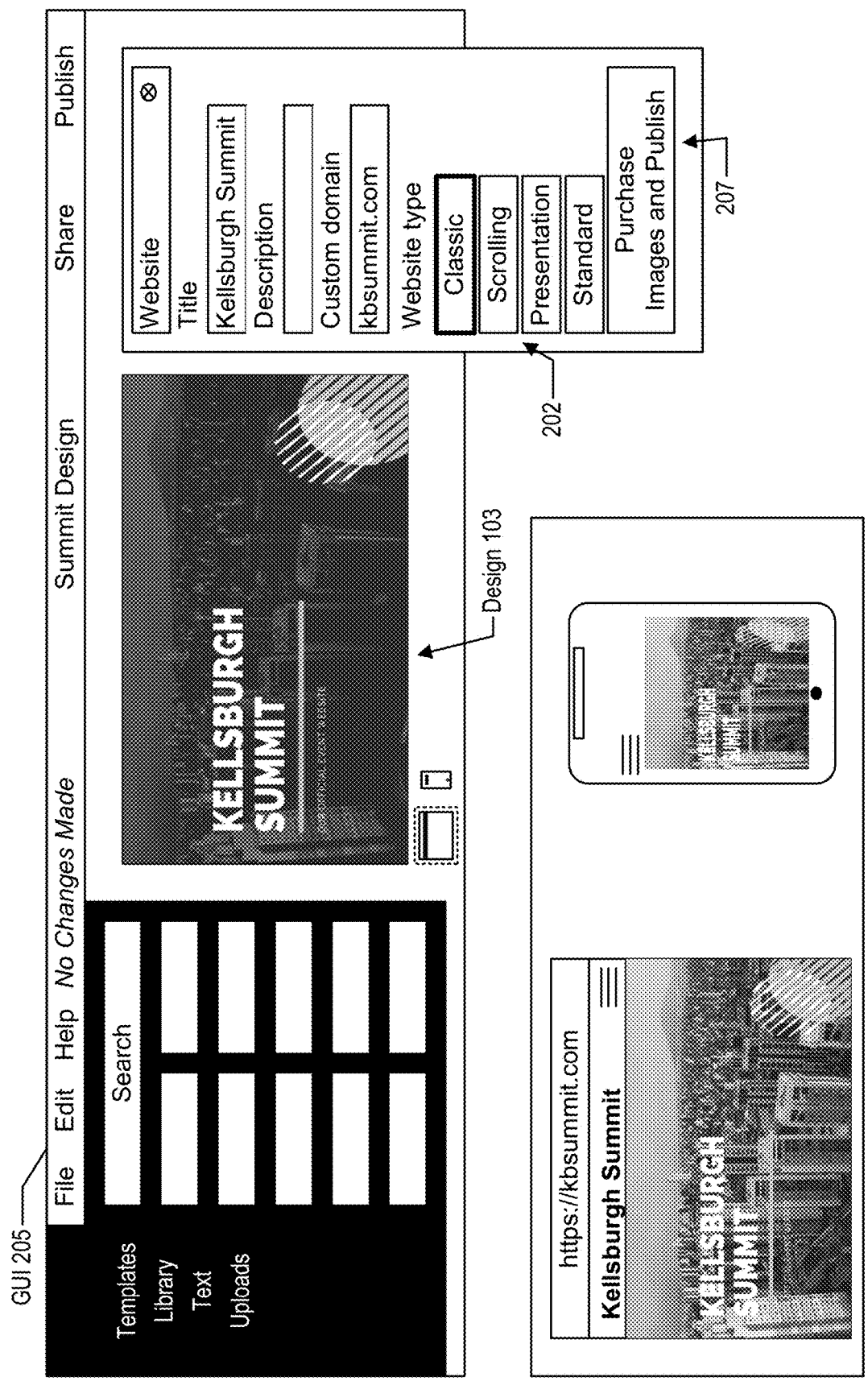
FIG. 2 illustrates a particular example of a website that may be generated by the system of FIG. 1.
Figure 3:
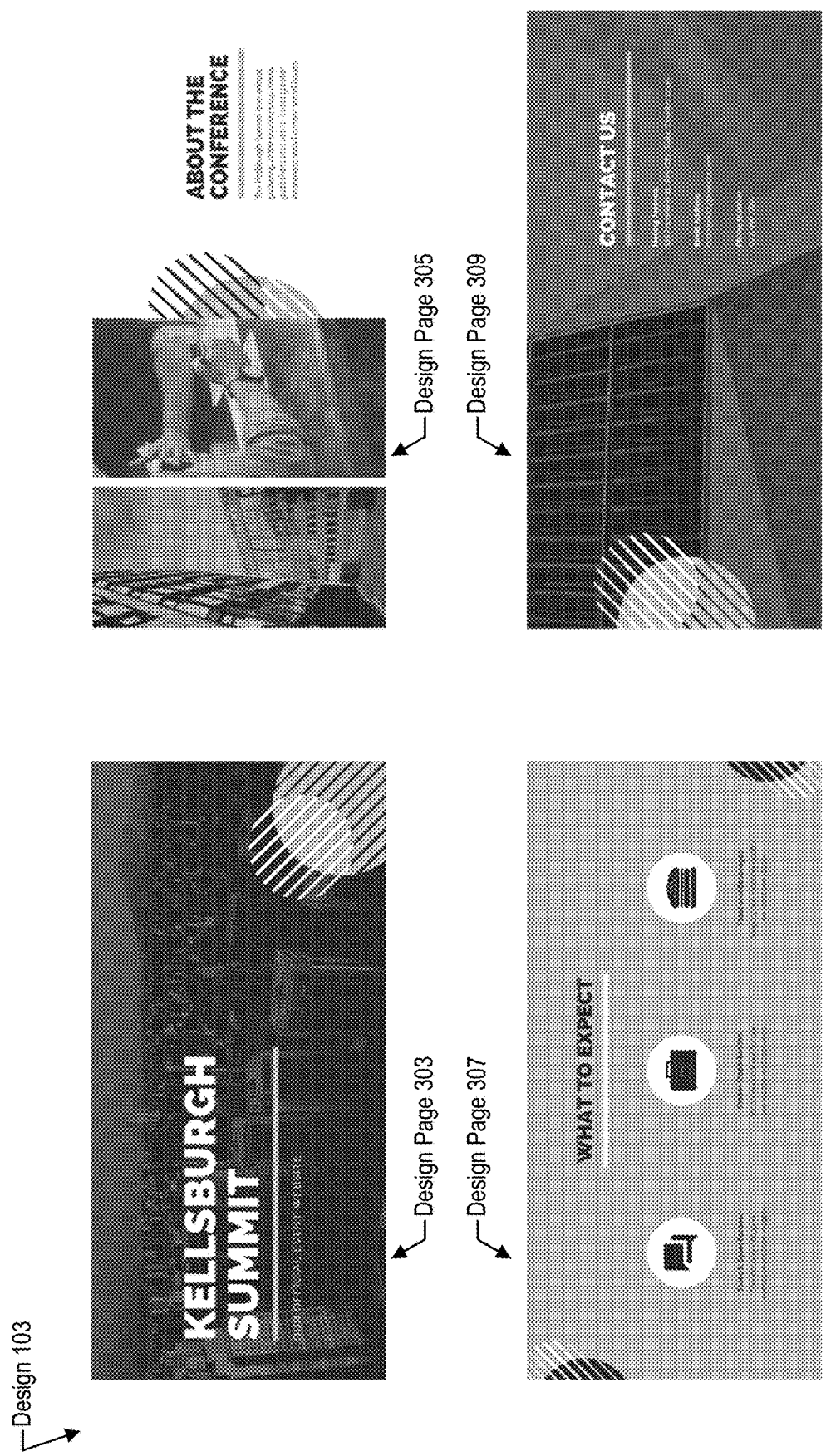
FIG. 3 illustrates another particular example of a website that may be generated by the system of FIG. 1.

The export service 110 may be communicatively coupled to one or more output format services 194. In FIG. 1, the output format services 194 include a web format service 186. The web format service 186 is configured to convert a design to a web output 181 (e.g., a website), as further described with reference to FIG. 2. In a particular aspect, the computing environment may include one or more servers configured to execute one or more of the output format services 194. For example, a fourth server may execute the web format service 186. In a particular aspect, a second computing environment external to the computing environment may execute one or more operations of the output format services 194. For example, a second computing environment executes one or more operations described herein with reference to the web format service 186. In a particular aspect, some formatting services may be "native" while others may be created by third parties. Services created by third parties may use one or more of the native services as building blocks. Third party services may be based on (e.g., use) application program interfaces (APIs) of native services exposed by a provider of the design website. It should be understood that allocations of format services to particular servers as described herein are provided as illustrative examples, and are not limiting.

Thus, the output format services 194 may, in certain examples, correspond to multiple services, each of which may be configured to generate a particular web output. To illustrate, a first output format service may be configured to generate web-compatible images from images in a design, and may thus be configured to adjust image format/encoding, resolution, color depth, etc. A second output format service may be configured to generate web-compatible text from text in a design, and may thus be configured to adjust fonts, font sizes, character spacing, text layout, etc. A third output format service may be configured to generate a navigation menu from a design. In different examples, more, fewer, or different output format services may be available.

When a user requests publication of a design, the load balancers may send a message to a server requesting execution of a particular service. The server may execute a virtual machine including an instance of the particular service, which, if the service is not already instantiated, may result in instantiation of the service. For example, the load balancers may send a message to initiate execution of the web format service 186. The server receiving the request may, in response, execute a virtual machine including an instance of the web format service 186. In a particular aspect, multiple servers may execute (virtual machines executing) instances of the same service.

The document service 126, the export service 110, the output format services 194, or a combination thereof, may be configured to communicate with one or more endpoints. In FIG. 1, the document service 126, the export service 110, the output format services 194, or a combination thereof may communicate, via the CDN 101, with an endpoint 172, an endpoint 174, an endpoint 176, one or more additional endpoints, or a combination thereof. An "endpoint" may also be included in the client device 192. For example, the client device 192 may include the endpoint 172. An endpoint may refer to an application, a server, a social network site, a web server, a device, or a combination thereof.

During operation, the user 104 may operate the client device 192 to access a graphic design website via the computing environment. The graphic design website may enable the user to create and modify a design 103 (which may be persisted to the document database) using web application(s) and/or Software-as-a-service components presented by the graphic design website. For example, the web front end may generate a graphical user interface (GUI) of the graphic design website. The user 104 may use the GUI to create and modify the design 103. The GUI may include one or more options to edit the design 103. The GUI may include a display portion that displays the design 103. In various aspects, the GUI may enable at least any graphic design function that is generally found in a standalone graphic design application, although it is to be appreciated that the GUI may enable other functionality as well.

In a particular aspect, the client device 192, in response to receiving user input 109 indicating edits to the design 103, sends the user input 109 to the backend computing environment. The document service 126 may update the design 103 based on the user input 109 and may store an updated version of the design 103 in the document database 184. In a particular aspect, the document service 126 sends an updated GUI to the client device 192, where the updated GUI corresponds to the updated version of the design 103 and provides visual feedback to the user regarding the edits being made to the design 103.

In a particular aspect, the GUI enables publishing the design 103 as a website, as further described with reference to FIGS. 2-16. In the example illustrated in FIG. 2, a GUI 205 includes a publish option 207 (e.g., a Purchase Images and Publish button) which may correspond to publishing output for a responsive website configured for web, tablet, or mobile display. The GUI 205 may include one or more options for selecting (or specifying) a website title, a description option to specify a website description, a custom domain option to specify a custom domain, one or more additional options, or a combination thereof. In the illustrated example, the website title is "Kellsburgh Summit" and the custom domain is "kbsummit.com." "No changes made" at the top of the GUI 205 may indicate that the design has not been modified since the last time the user saved the design.

The GUI 205 includes a display portion configured to display the design 103. In the example illustrated in FIG. 3, the design 103 includes four design pages 303 305, 307, and 309. In a particular aspect, a design page may include multiple layers of elements. Certain layers may be considered as having background elements, while other layers may be considered as having foreground. Examples of background and foreground elements may include, but are not limited to, images, titles, subtitles, text, or a combination thereof. For example, the design page 303 includes a first title (e.g., "Kellsburgh Summit"), first text (e.g., "Our Official Event Website"), a first background image of a city skyline, and foreground images corresponding to the horizontal bar between the title and the subtitle, and to the broken circles design on the lower right.

The design page 305 includes a second title (e.g., "About the Conference"), second text, a second background image(s), second foreground image(s), or a combination thereof. The design page 307 includes a third title (e.g., "What to Expect"), one or more textboxes, a background image, one or more foreground images, or a combination thereof. The design page 309 includes a fourth title (e.g., "Contact Us"), one or more textboxes, a background image, a foreground image, or a combination thereof.

The design pages 161 of FIG. 1 include the design page 303, the design page 305, the design page 307, the design page 309, or a combination thereof. It should be understood that the design pages 161 including four design pages is provided as an illustrative example. In some examples, the design pages 161 include fewer than four design pages or more than four design pages.

Returning to FIG. 2, the GUI 205 includes options 202 for selecting a website type. The GUI 205 may include one or more options for selecting (or specifying) one or more endpoints. For example, the GUI 205 may include a first option to select the endpoint 172, a second option to select the endpoint 174, a third option to select the endpoint 176, or a combination thereof.

During operation, the GUI 205 may be displayed, for example by a browser or other application executing at the client device 192. The user 104 may use the options 202 to select a website type 177 (e.g., "classic"). The user 104 may select the publish option 207 by clicking on the "Purchase Images and Publish" button. The client device 192 may generate a user request 111 in response to detecting the user selection of the publish option 207. The user request 111 may indicate the website type 177 (e.g., "classic"). In some examples, the user request 111 also indicates a selected endpoint (e.g., the endpoint 174). For example, the user request 111 indicates one or more endpoint identifier(s) (ID(s)) 117 of the selected endpoints. The client device 192 may transmit the user request 111, browser information of the browser, or a combination thereof, to the backend infrastructure (e.g., to the export service 110).

When the user request 111 includes endpoint IDs, the export service 110 may, in response to receiving the user request 111, generate (or update) configuration data to indicate the identified endpoints. The export service 110 may store the configuration data in the export database in association with a user account of the user 104.

In a particular aspect, the graphic design website may enable editing of at least a portion of the configuration data independently of the user request 111. For example, the GUI may include a configuration update option. The web front end may send a second GUI to the client device 192 in response to receiving a user selection of the configuration update option. The user 104 may edit (e.g., update) one or more fields of the second GUI. The web front end may update the configuration data based on the values of one or more fields of the second GUI.

In a particular aspect, the client device 192 refrains from sending the endpoint ID(s) 117. In a particular aspect, the publish option corresponds to a "publish as usual" option. In this aspect, the export service 110, in response to receiving the user request 111 and determining that the user request 111 does not indicate the endpoint ID(s) 117, retrieves the endpoint ID(s) 117 from the configuration data.

In a particular aspect, the publish option corresponds to a "publish to all" option, in which case the user request 111 does not include endpoint IDs. In this aspect, the export service 110 may determine that publication is to be performed for all supported endpoints (e.g., the website is to be made available for all viewing options, such as desktop viewing, mobile phone viewing, tablet viewing, game console viewing, etc.).

To publish the design 103 to a "classic" website, the export service 110 may send a first request to the web format service 186, where the first request identifies the design 103. For example, the first request may include a unique identifier of the design 103, a uniform resource locator (URL) of the design 103, a file path of the design 103, a memory/storage address at which the design 103 is accessible, etc.

The first request may also indicate the selected the website type 177 (e.g., "classic"). In some examples, the first request also indicates the selected endpoints (e.g., the endpoint 174). If publishing resources are occupied, the export service 110 may add the first request to a queue. The web format service 186 may retrieve and process queued messages from the queue.

In a particular aspect, a load balancer, in response to determining that the message queue includes a request for the web format service 186, sends a message to a server to instantiate the web format service 186. The load balancer may select a specific server to instantiate a particular service based on various criteria. For example, the criteria under which a server is selected to instantiate a service may include: 1) what server is next on a list of available servers, 2) that a load of a server is less than a first threshold, 3) that a load of a different server already executing an instance of the service is greater than a second threshold, 4) that no servers are currently executing the service, or a combination thereof. A server's load may be determined, for example, based on a number of queued requests for the server, a number of requests being processed by the server, etc. The server selected by the load balancer may instantiate the web format service 186 in response to being instructed to do so by the load balancer. The criteria used by a load balancer to select a server to instantiate a service may, in some examples, be programmable, such as by an information technology (IT) professional associated with the computing environment. The computing environment may thus support operational characteristics (e.g., a number of executing services) that can be dynamically configured based on programmable criteria. In some aspects, a load balancer determines whether to request instantiation of a service based on whether one or more instances of the service are already executing, a load of the one or more already-running instances, or a combination thereof. For example, if web publishing has been occurring fairly regularly, one or more web format services may already be instantiated at the time the first request is made, and the load balancer may assign the first request to one of those already-instantiated web format services.

The web format service 186 may receive the first request from the export service 110, and may, in response, retrieve the design 103 from the document database, for example based on a design ID included in the first request.

The web format service 186 may be configured to perform, or cause to be performed, various tasks 171 with respect to the design 103 (e.g., website generation tasks). In an example, the tasks 171 include generating webpages of various types, generating navigation menus of various types, or a combination thereof. To illustrate, webpages generated according to a first webpage type 131 (e.g., "classic") may include a webpage corresponding to each page of the underlying design 103. Webpages of a second webpage type 135 (e.g., "scroll") may include a single webpage corresponding to multiple pages of the design 103. For example, a first portion of the webpage may correspond to a first page of the design 103, a second portion of the webpage (that can be seen by scrolling the webpage) may correspond to a second page of the design 103, etc.

In an example, a navigation menu of a first menu type 137 (e.g., "classic") includes individual menu items (e.g., text and/or icons) corresponding to each webpage. A navigation menu of a second menu type 139 (e.g., "scroll") may include a menu items corresponding to different portions of a single webpage. It should be understood that particular types of webpages and particular types of navigation menus are described herein as illustrative examples. In other implementations, the tasks 171 can include generating other types of webpages, generating other types of navigation menus, other website generation tasks, or a combination thereof.

Particular subsets of the tasks 171 correspond to each of the website types 175. For example, the web format service 186 may have access to mapping data that maps each of the website types 175 to a particular subset of the tasks 171. In a particular aspect, the mapping data includes default data, a portion of the user request 111, user input, configuration input, or a combination thereof. The tasks 171 may include generating one or more webpages of the first webpage type 131, generating one or more webpages of the second webpage type 135, generating a navigation menu of the first menu type 137, generating a navigation menu of a second menu type 139, or a combination thereof. In a particular aspect, the mapping data indicates each website type (e.g., "classic," "scroll," "presentation," "standard," etc.) corresponds to a different respective subset of the tasks 171. To illustrate, generating a "classic" website may include performing tasks to convert each page of the design 103 to a corresponding "classic" webpage, generating a navigation menu that is added to each such webpage, etc. As another example, generating a "scroll" website may include performing tasks to generate web-compatible output corresponding to each of the pages in the design 103, generating a single webpage that will display each of the web-compatible outputs, generating a scroll navigation menu or other navigation functionality on the webpage (e.g., via scripting languages), etc.

The web format service 186 may selects, based on the website type 177 selected by the user, one or more task(s) 173 from the plurality of tasks 171 that can be used to generate the desired type of website. The web format service 186 may determine which tasks 173 to select, and in what order the tasks 173 should be executed, based at least in part on the aforementioned mapping data. The web format service 186 may perform the tasks 173 to generate one or more webpages 163 of a website, as further described with reference to FIGS. 4-16. The tasks 173 may be performed by the web format service 186 itself and/or may be queued for other services to perform and then report results back to the web format service 186.

Figure 4:
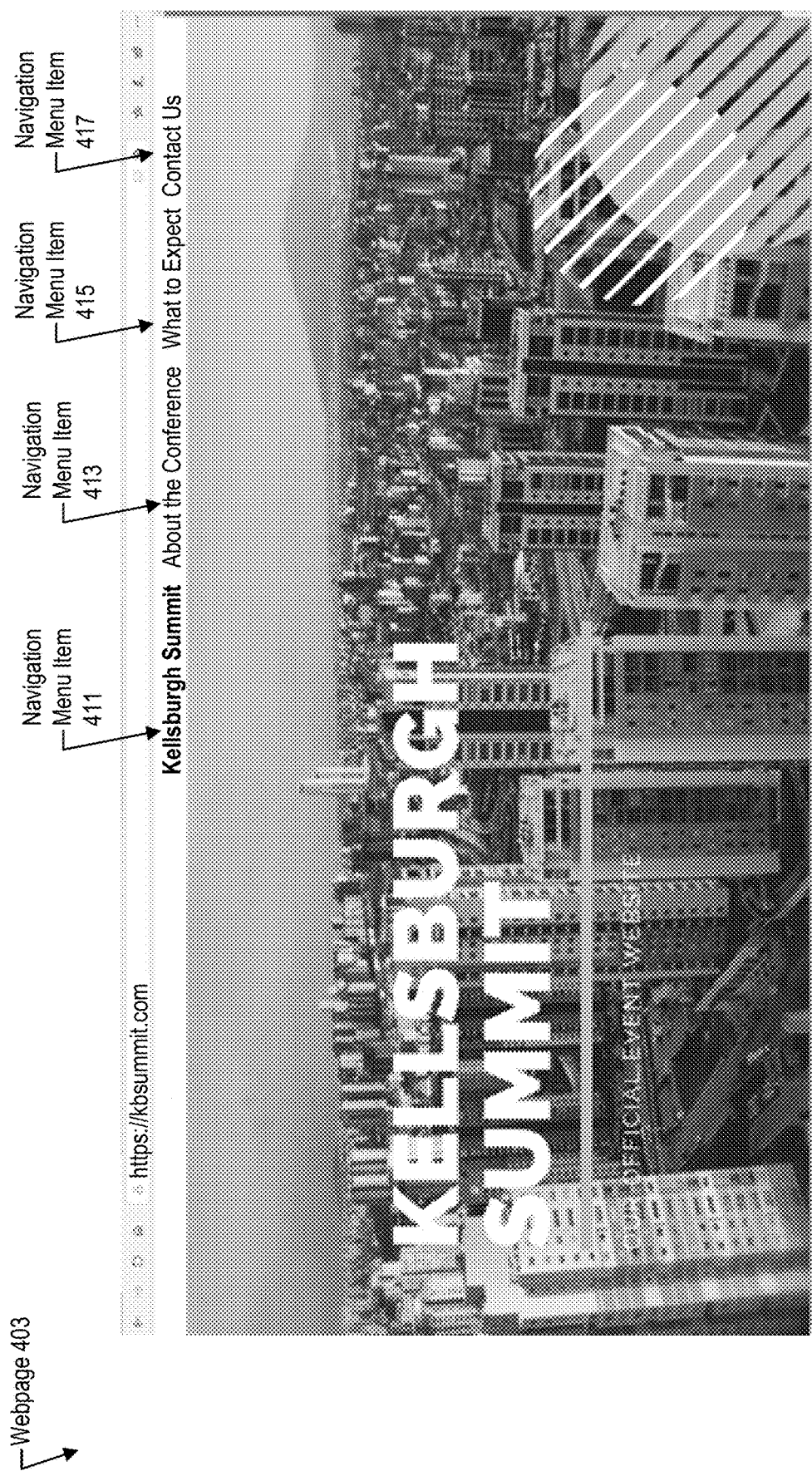
FIG. 4 illustrates another particular example of a website that may be generated by the system of FIG. 1.
Figure 5:
FIG. 5 illustrates another particular example of a website that may be generated by the system of FIG. 1.
Figure 6:
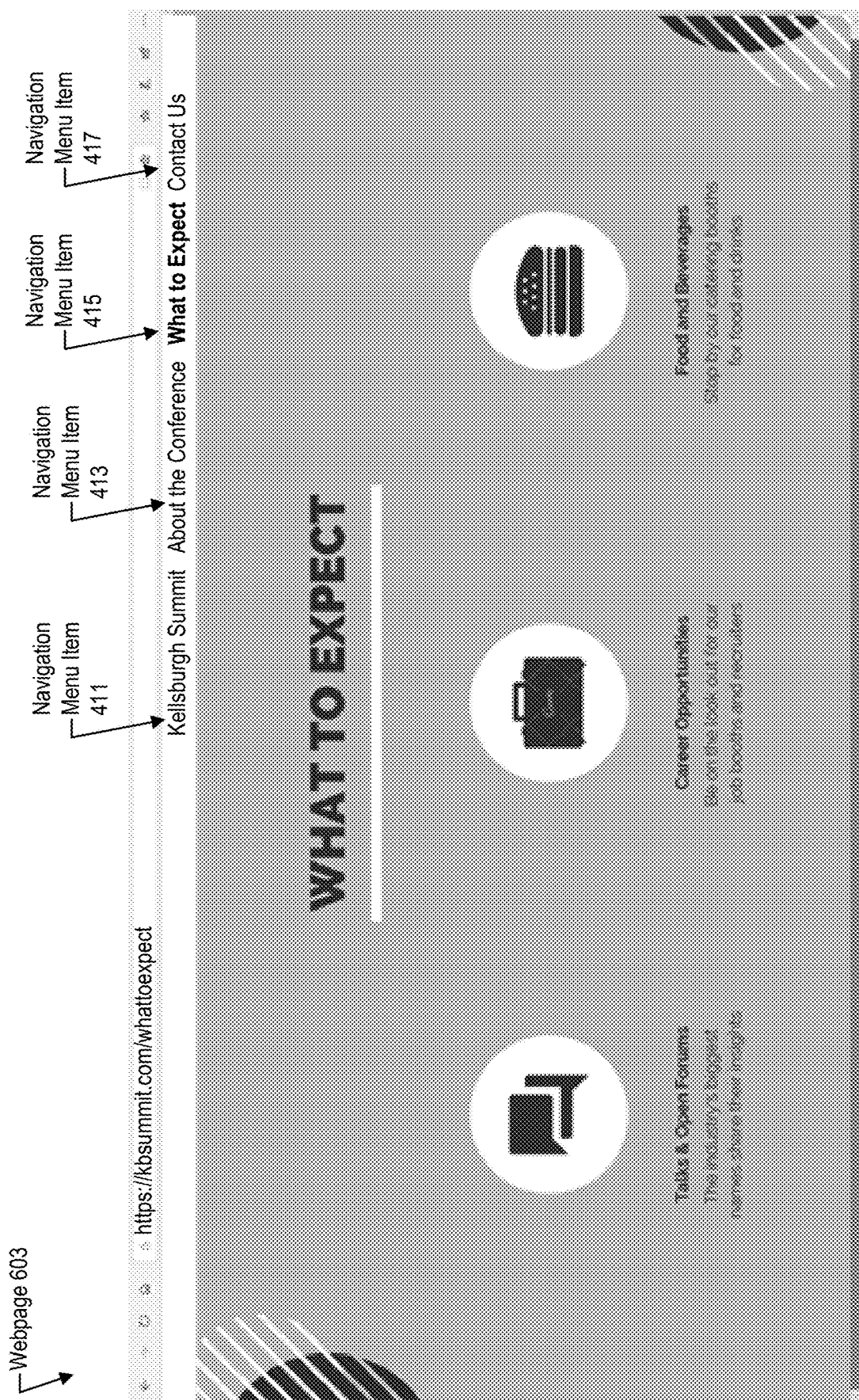
FIG. 6 illustrates another particular example of a website that may be generated by the system of FIG. 1.
Figure 7:
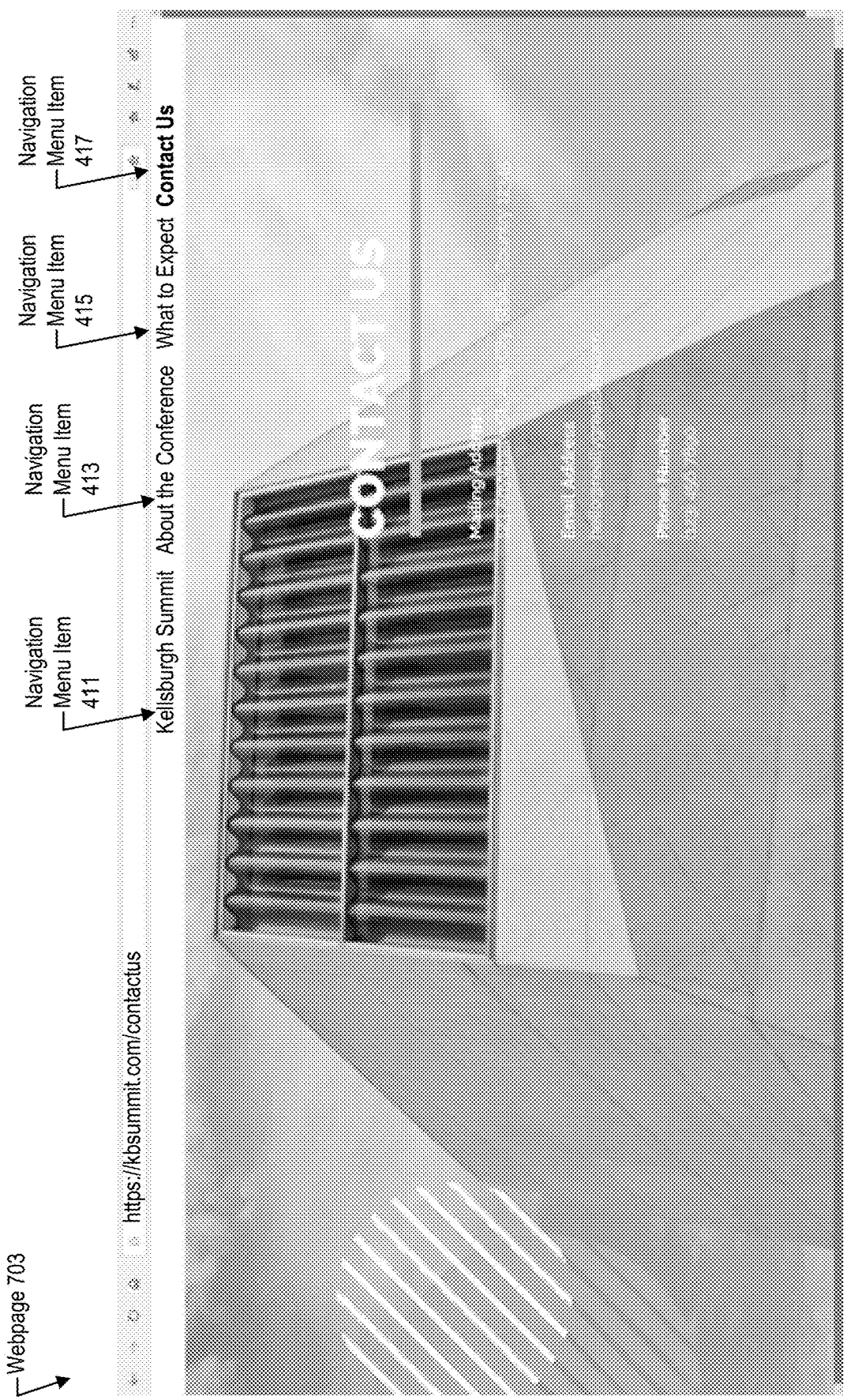
FIG. 7 illustrates another particular example of a website that may be generated by the system of FIG. 1.

FIGS. 4-7 illustrate an example of publishing the design 103 to a "classic" website. In FIG. 4, a webpage 403 corresponds to the design page 303 of FIG. 3. In FIG. 5, a webpage 503 corresponds to the design page 305 of FIG. 3. In FIG. 6, a webpage 603 corresponds to the design page 307 of FIG. 3. In FIG. 7, a webpage 703 corresponds to the design page 309 of FIG. 3. Tasks performed to generate the webpages of FIGS. 4-7 may include "classic" website generation tasks, such as tasks to convert design pages to webpages, tasks to generate a navigation menu that will be included on each webpage (or in a separate frame or other browser construct that is distinct from the individual webpages), tasks to combine and link the various output together (e.g., including adjusting HTML, XML, CSS, and/or web script code), etc.

In a particular example, the design page 303 is represented by one or more first key-value pairs (or n-tuples) in the document corresponding to the design 103. In this example, the web format service 186 generates the corresponding webpage 403 by converting the first key-value pairs (or n-tuples) to web elements (e.g., HTML elements) corresponding to a web format (e.g., a HTML format). Similarly, the remaining webpages of the classic website may be generated based on processing the key-value pairs (or n-tuples) corresponding to the remaining design pages.

When a design page includes a background image, the tasks 173 may include generating the corresponding webpage such that the background image covers an entire container (e.g., window) used to display the webpage. For example, the webpage element may be tagged (e.g., a "background-size:cover" indication in CSS) to indicate that the background image is to cover an entire container (e.g., window).

When a design page includes foreground content, the tasks 173 may include generating the corresponding webpage such that the foreground content is scaled, positioned, or both. For example, the webpage 403 may include an element (e.g., "class='center'") indicating that the foreground image is to be displayed in a particular position (e.g., center). As another example, the webpage 403 may include an element (e.g., "width: 50%") indicating that a particular foreground image is to scale by a particular factor (e.g., 50%) relative to the display of the webpage 403.

Generating the webpages of FIGS. 4-7 may also include task(s) 173 to generate the navigation menu 167. The navigation menu 167 may, in accordance with the selected "classic" website type, include a navigation menu item 411, 413, 415, and 417 corresponding to the webpages 403, 405, 407, and 409, respectively.

The tasks 173 may include selecting representative text (e.g., "Kellsburgh Summit") from the design 103 for each navigation menu item. In a particular aspect, if a design page includes a title, the title may be selected automatically as the representative text. Alternatively, or in addition, the representative text may automatically be identified based on certain text in the design page having particular properties (e.g., a largest font size, a particular font style (e.g., bold), a page number of the page, etc.). In a particular aspect, the representative text may be selected or modified to include fewer than a threshold number of words, where the threshold is dynamically determined based on the expected display width of the website (e.g., based on type of endpoint(s) specified in the publishing request) and the number of items in the navigation menu (e.g., based on the number of pages in the design 103).

The navigation menu item 411 may be generated to indicate the representative text (e.g., "Kellsburgh Summit"), which is selectable (e.g., has a corresponding HTML a tag or href attribute) to navigate to the webpage 403. Similarly, the web format service 186 generates the navigation menu items 413, 415, 417 corresponding to the webpages 503, 603, and 703, respectively. In a "scroll" website, the navigation menu may be "anchored" so that it remains on screen regardless of which portion(s) of the single webpage are on screen.

The webpages 163 may be generated and/or updated to include the navigation menu 167. In a particular aspect, the web format service 186 generates an image output 153 by rendering the webpages 163 based on browser information of the client device 192 and generates an updated version of the webpages 163 based on the image output 153, as described herein.

Figure 8:
FIG. 8 illustrates another particular example of a website that may be generated by the system of FIG. 1.

FIG. 8 illustrates an example of publishing the design 103 as a "classic" website (including an illustrative webpage 803) that is configured to be viewed on particular devices or types of devices. To illustrate, the code for the webpages 163 (e.g., HTML code) may include portions that are designated for presentation on smaller/portrait-oriented (e.g., taller than they are wide) display devices, such as mobile telephones, personal digital assistants, or tablet computers being operated in portrait mode. In another example, there are alternate webpages 163 that are provided to a device that indicates it is a mobile device or that it is viewing the website in portrait mode. Other content on the webpages 163 (or other versions of the webpages 163) may include portions that are designated for presentation on larger display devices, such as a desktop monitor, and/or devices that are in landscape mode (e.g., wider than they are tall). In a particular aspect, due to the reduced width of the webpage 803, the navigation menu shown in FIGS. 4-7 may be replaced with a "hamburger"-style GUI element, such as option 805, that is operable to display a menu having selectable items corresponding to portrait versions of each page of the design 103.

Figure 9:
FIG. 9 illustrates another particular example of a website that may be generated by the system of FIG. 1.

FIG. 9 illustrates an example of publishing the design 103 as a "scroll" website. In a particular aspect, the "scroll" website may include a single webpage 900 that includes, from top to bottom, content corresponding to each of the pages of the design 103.

In a particular example, responsive to a determination that the user requested to publish the design 103 as a "scroll" website, the web format service 186 initiates execution of tasks 173 that result in the single webpage 900 having content from each page of the design 103. To illustrate, web content may be generated from each page of the design, which may include invoking various image processing services or functions, etc. When the pages of the design 103 are independent of each other (e.g., there is not dynamic content on one page that depends on content or interaction with another page), the web content for multiple pages may be generated at least partially concurrently. The single webpage 900 may be generated such that the web content corresponding to each of the pages is presented from the top down. Depending on implementation (or user selection of a configuration option), the webpage 900 may be coded/scripted such that when the webpage 900 is viewed in a browser, all of the web content may be loaded at once.

Alternatively, the content for a next page of the design may be loaded on demand, such as only after the user scrolls down past some or all of the web content for the previous page of the design. In a particular aspect, once content has been loaded, the content remains on the webpage 900, i.e., there is no loading animation or transition when the user scrolls back up through the webpage 900.

In a particular aspect, when each page of the design 103 includes the same background image, the webpage 900 indicates that the background image is to cover an entire container (e.g., window) used to display the webpage 900, such as via a tag/element "background-size:cover." In a particular aspect, when each page of the design 103 includes the same background content, when the webpage 900 is scrolled, foreground content of the webpage 900 moves/changes while the background content remains stationary. In a particular aspect, when at least one page of the design 103 includes a background image, the corresponding portion of the webpage 900 is coded/scripted to have a parallax scrolling effect, as further described with reference to FIG. 10. For example, the web format service 186 generates the portion of the webpage 900 to include an element (e.g., "background-attachment: fixed") such that, when the webpage 900 is scrolled, the corresponding background image moves at a first speed that is different, (e.g., slower) than a second speed at which at least certain foreground content of the webpage 900 moves.

In a particular aspect, when pages of the design 103 include foreground content, the webpage 900 is generated such that the foreground content is scaled, positioned, or both, as described above with reference to the "classic" website type. For example, the webpage 900 may include an element (e.g., "class='center'") indicating that a particular foreground image is to be displayed in a particular position (e.g., center) in the webpage 900. As another example, the webpage 900 may include an element (e.g., "width: 50%") to indicate that a foreground image is to scale by a particular factor (e.g., 50%) relative to the display of the webpage 900.

In a particular aspect, the webpage 900 is generated such that content that abuts an edge of a design page also abuts a corresponding edge of the webpage 900 when the webpage 900 is displayed, regardless of screen width and/or screen height. For example, if a particular foreground image abuts a particular edge (e.g., a right edge) of the design page 303, the webpage 900 may include an element (e.g., "class='floatRight'") indicating that the particular foreground image is to abut a corresponding edge of the webpage 900.

In a particular aspect, the webpage 900 has animated foreground content. For example, the webpage 900 may include an element indicating that opacity of the particular foreground image is to transition from a first opacity (e.g., 0%) to a second opacity (e.g., 100%) upon loading. As another example, the webpage 900 may include an element indicating that a position of the particular foreground image is to transition (e.g., vertically) by a particular offset upon loading. Transitioning opacity and offsetting in the vertical direction may result in a "rising" effect for foreground content. In a particular aspect, ordering of grid cells is used to stagger animation of foreground content. For example, the web format service 186 may generate (or update) the webpage 900 such that foreground content corresponding to particular grid cells of the design pages 161 is animated.

In a particular aspect, ordering of grid cells or a position of foreground content is used to generate the webpage 900, such that the foreground content automatically "reflows" when the webpage 900 is displayed on a smaller display, such as a mobile device. For example, the web format service 186 may generate (or update) the webpage 900 such that a particular foreground element is assigned a particular position or a particular grid cell when the webpage 900 is displayed on the smaller display.

Figure 10:
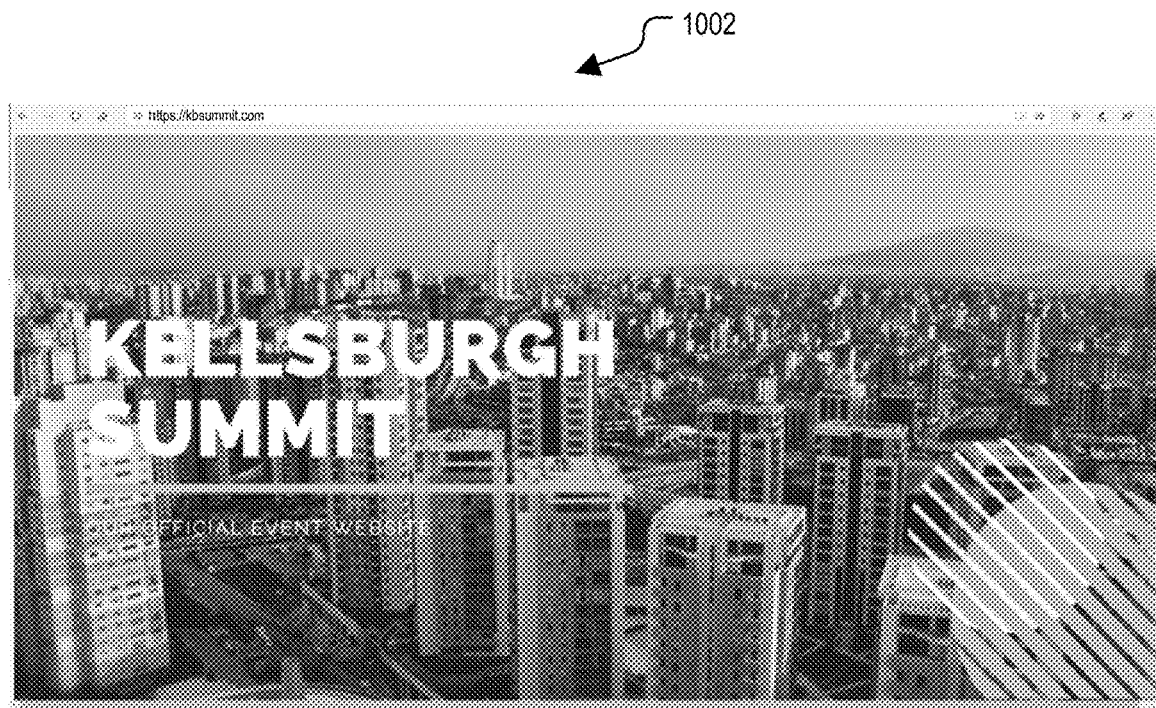
FIG. 10 illustrates another particular example of a website that may be generated by the system of FIG. 1.
Figure 10:
Figure 11:
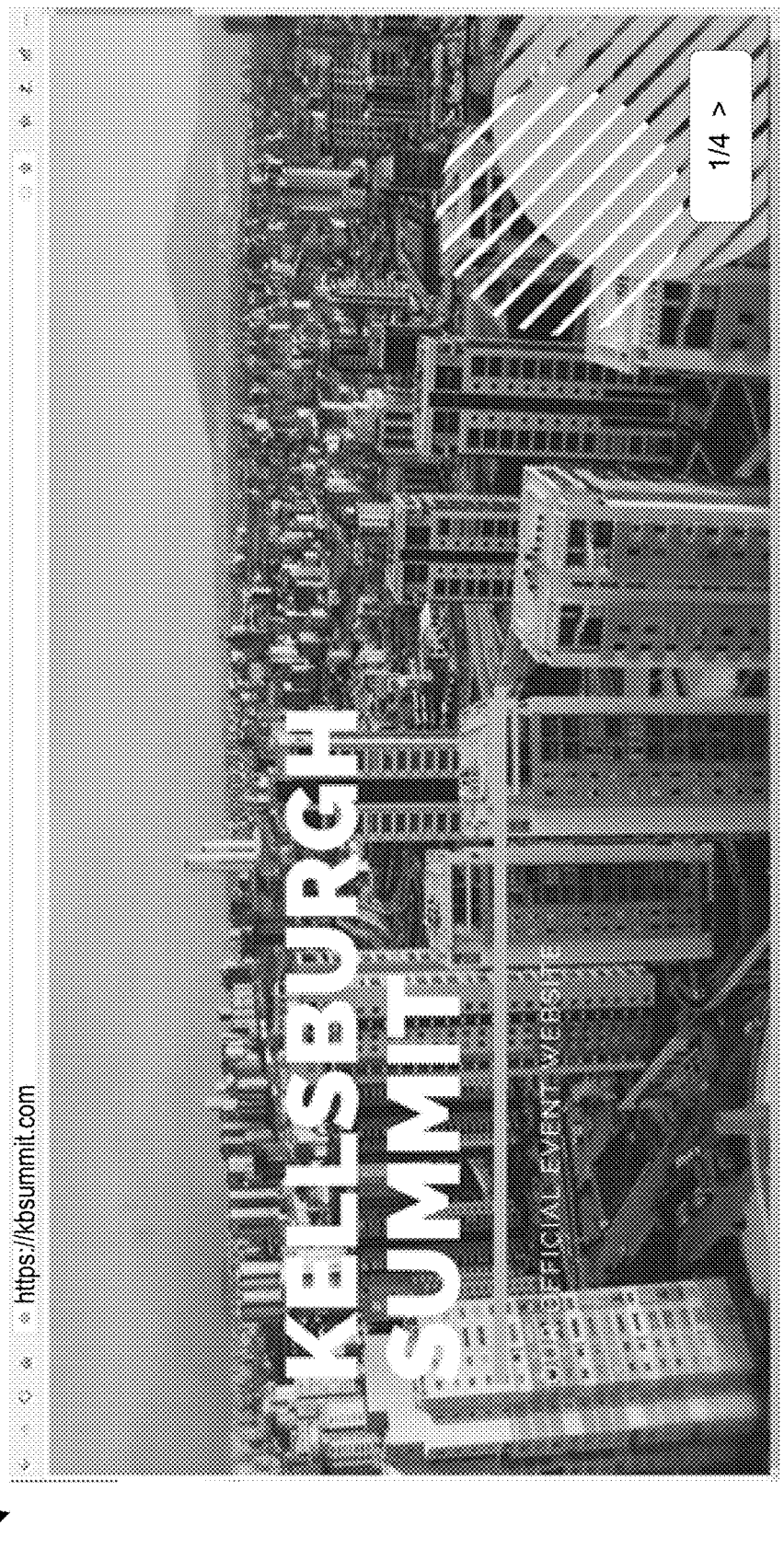
FIG. 11 illustrates another particular example of a website that may be generated by the system of FIG. 1.
Figure 12:
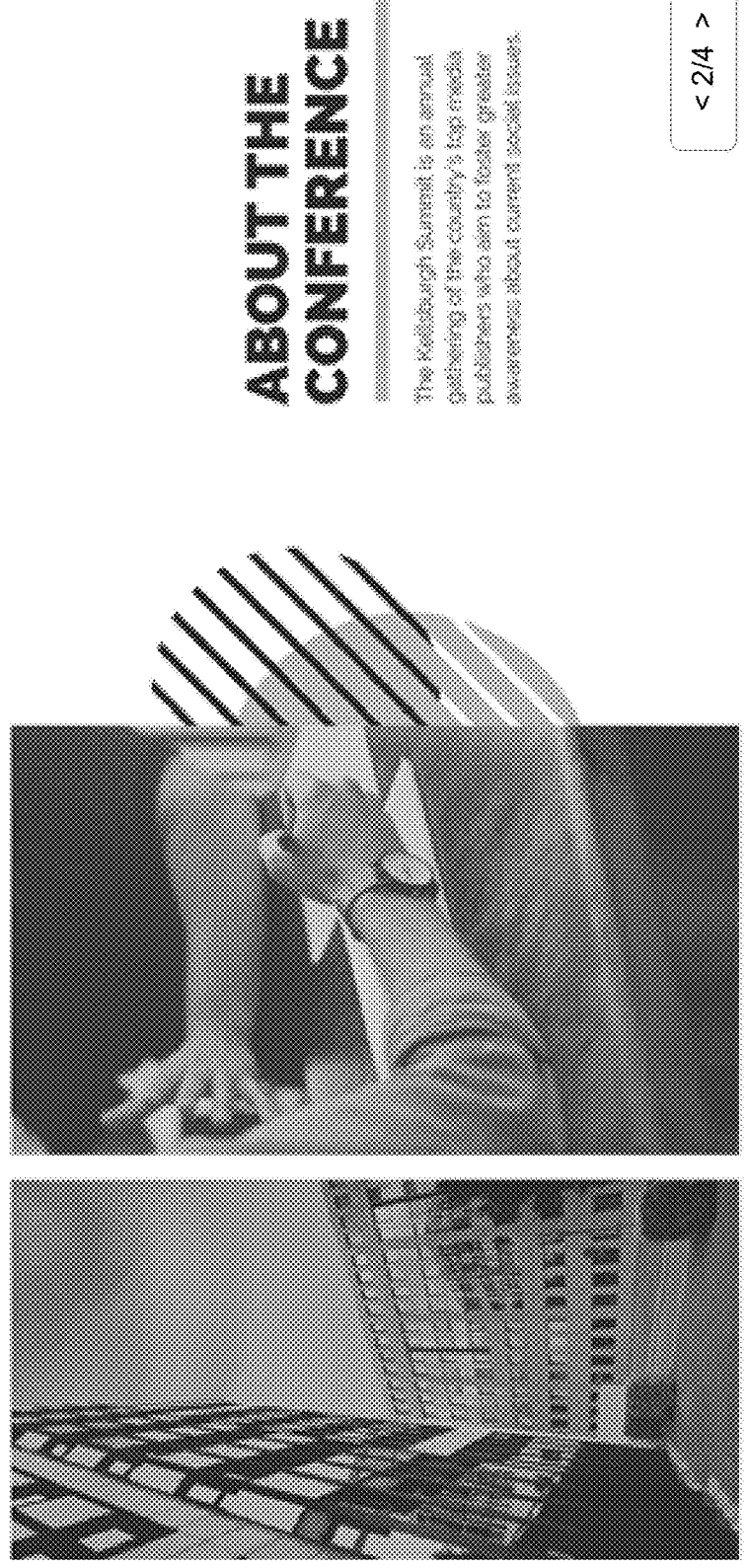
FIG. 12 illustrates another particular example of a website that may be generated by the system of FIG. 1.
Figure 13:
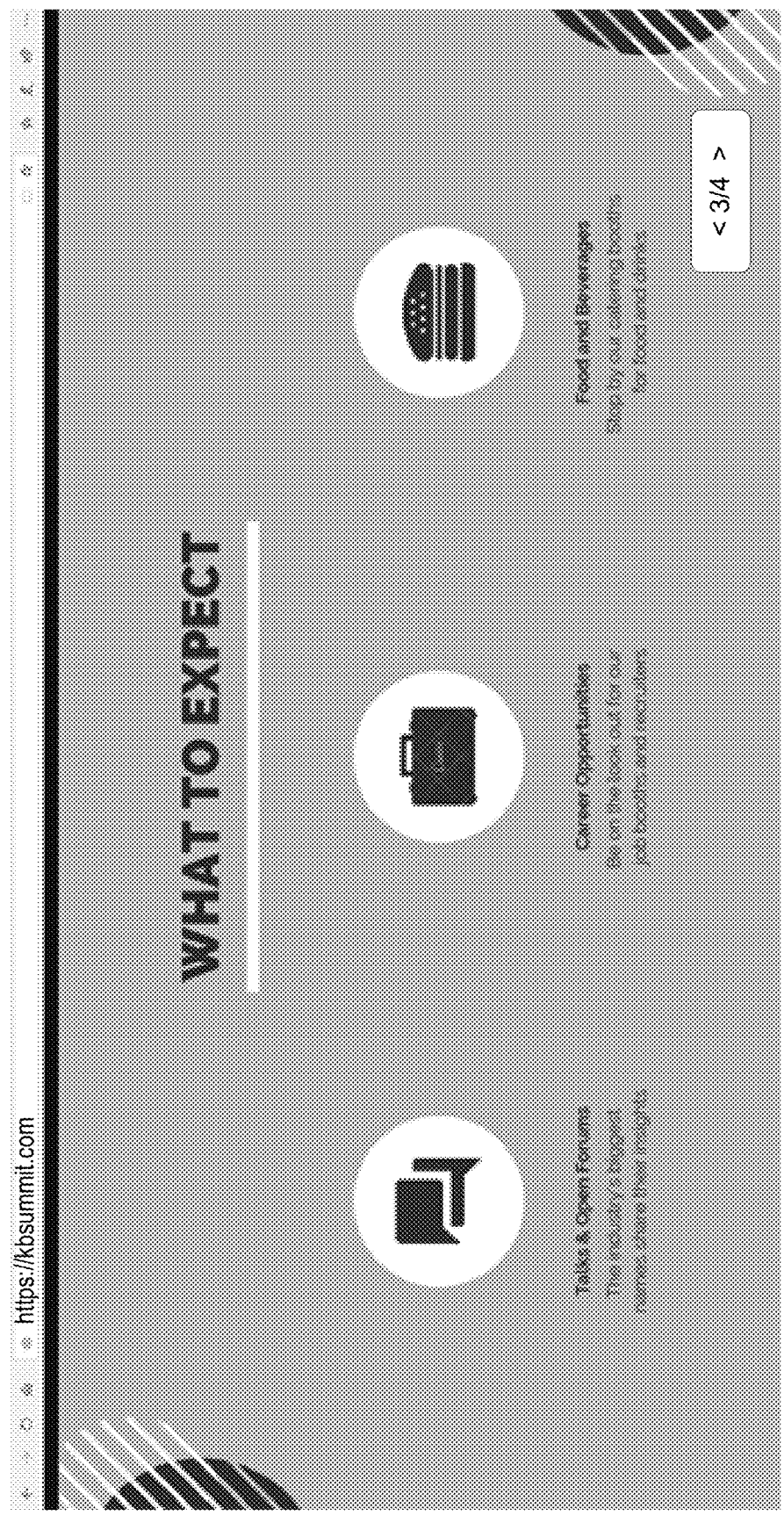
FIG. 13 illustrates another particular example of a website that may be generated by the system of FIG. 1.
Figure 14:
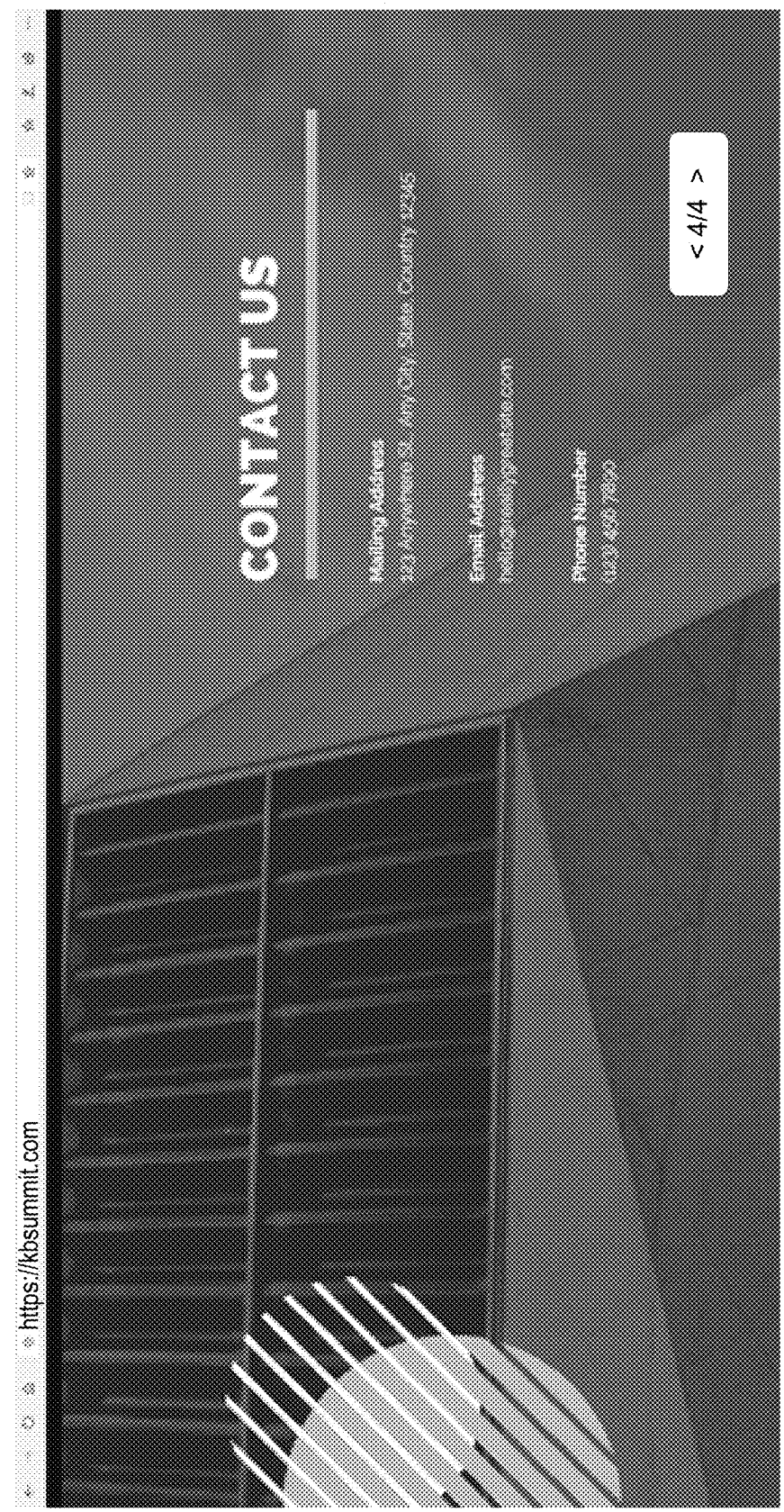
FIG. 14 illustrates another particular example of a website that may be generated by the system of FIG. 1.

FIG. 10 illustrates an example of publishing the design 103 as a website that includes a parallax effect. In FIG. 10, a first example 1002 corresponds to a first displayed version of the webpage 900 of FIG. 9. A second example 1004 corresponds to a second displayed version of the webpage 900. The first example 1002 illustrates the webpage 900 prior to scrolling and the second example 1004 illustrates the webpage 900 subsequent to scrolling. As shown in FIG. 10, foreground text (e.g., "Kellsburgh Summit") has moved towards the top of the browser window at a faster rate than the background image (compare, for example, where the bottom of the "K" in "Kellsburgh" is located relative to the top of the building on the far left of the background image).

FIGS. 11-14 illustrate an example of publishing the design 103 as a "presentation" website. To illustrate, webpages 1103, 1203, 1303, and 1403 may correspond to the design pages 303, 305, 307, and 309, respectively.

Certain tasks 173 may be used for more than one type of website, whereas other tasks may be specific to a particular type of website. For example, at least some tasks described above with reference to generating a "classic" website may also be used to generate a "presentation" website. To illustrate, at least some of the image and text content shown in the webpages 1103-1403 may be generated by the tasks used to generate the image and text content shown for the "classic" website in FIGS. 4-8.

However, the "presentation" website may not have a navigation menu, and thus the tasks described to generate the navigation menu shown in FIGS. 4-7, or the "hamburger"-style option 805 of FIG. 8, may not be executed when generating a "presentation" website. Instead, tasks 173 may be executed to generate a navigation element that includes a page number of the current page and previous/next controls (e.g., arrows), as shown at the bottom right of FIGS. 11-14. The first page may not have a previous arrow and the last page may not have a next arrow. In alternate examples the slide number may be located, the slide number/previous arrow/next arrow may be placed in different locations, etc.

Figure 15:
FIG. 15 illustrates another particular example of a website that may be generated by the system of FIG. 1.

FIG. 15 illustrates an example of publishing the design 103 as a "standard" website. In a "standard" website, a single webpage 1503 corresponds to all of the design pages 303, 305, 307, and 309 of FIG. 3. However, unlike a "scroll" website, the "standard" website may not include advanced animations or parallax effects. Instead, the "standard" website may include a navigation menu, as described with reference to the "classic" website of FIGS. 4-8. To illustrate, the navigation menu may include navigation menu items 1511, 1513, 1515, and 1517. Thus, the tasks 173 executed to generate the "standard" website may include some but not all "classic" website tasks and some but not all "scroll" website tasks. Rather than resulting in the loading of a different webpage (as in a "classic" website), selection of a navigation menu item 1511-1517 may cause automatic scrolling of the webpage 1503 up or down to a relevant portion.

Figure 16:
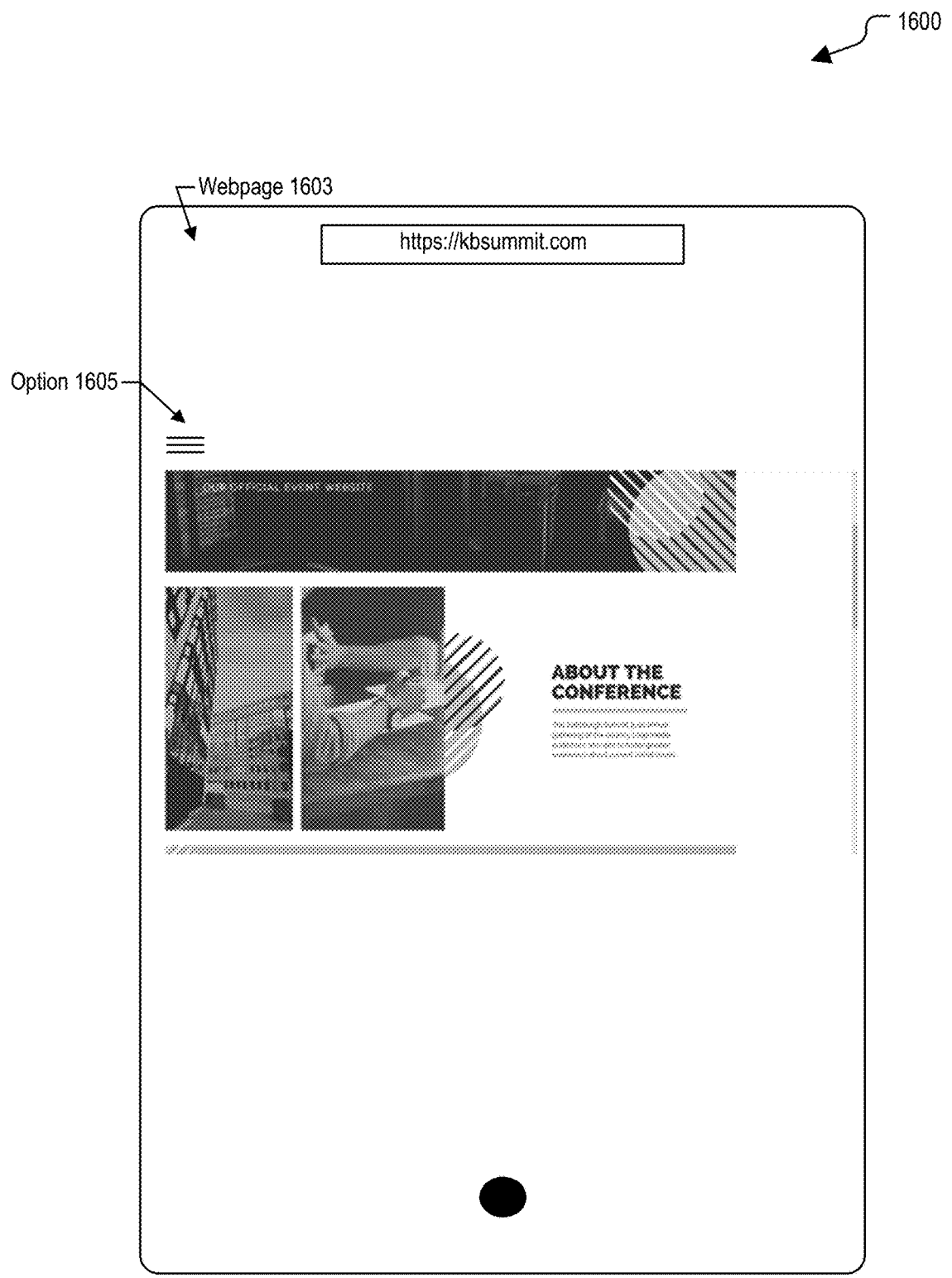
FIG. 16 illustrates another particular example of a website that may be generated by the system of FIG. 1.

FIG. 16 illustrates an example of publishing the design 103 as a "presentation" website for mobile devices and/or devices in portrait orientation. In this example, the "hamburger"-style option is operable to display a menu in which different elements can be selected to automatically scroll to a specific portion of the webpage 1603. In a particular aspect, the webpage 1603 includes a smaller (e.g., cropped) version of a background image included in the webpage 1503 of FIG. 15.

Although not shown, other website types may also be supported. For example, a "document" website type may include a navigation menu on the left side, the navigation menu having an item corresponding to each page of the design 103. The webpages corresponding to the various pages of the design may be shown as in "presentation" websites, e.g., with a control that includes a page/slide number a previous slide/page control, and a next slide/page control. Returning to FIG. 1, the export service 110 may generate the web output 181 by executing (or causing to be executed) the selected tasks 173. For example, the export service 110 may generate a request for the web format service 186, where the request indicates the design 103, the endpoint ID(s) 117, or a combination thereof. The export service 110 may send the request to the web format service 186, as described with reference to FIG. 1. The web format service 186 may generate the web output 181 by converting the design 103 to a website.

The design 103 that the user can create/edit/store/load may have a platform-independent format, such as a JavaScript® (a registered trademark of Sun Microsystems, Inc., Redwood Shores, Calif.) object notation (JSON) format. The design 103 may be represented by one or more key-value pairs. The web format service 186 may generate the web output 181 having a particular format (e.g., an HTML format) by converting the key-value pairs representative of the design 103 to web elements (e.g., HTML elements). For example, a first key-value pair may indicate that the design 103 includes a media item 141 (e.g., an image). To illustrate, the first key-value pair may indicate an identifier of the media item 141. The web format service 186 may generate the web output 181 including an HTML element (e.g., an HTML tag) for the media item 141. For example, the HTML element may be an image tag and may include the identifier of the media item 141 (e.g., <img src="identifier">). The same or additional key-value pairs may indicate a size of the image, a position of the image, a border of the image, etc. Such additional properties may result in additional corresponding HTML elements.

In a particular aspect, the design 103 may include a compressed representation of an image. For example, a key-value pair may include an identifier of the image, where the image may be retrievable from the media database 185 using the identifier, such as an address or a network accessible link. Multiple designs created by various users include that same identifier of the image. Designs may typically be made of multiple foreground/background components, and therefore including the image identifiers in designs (such as the design 103) instead of images themselves, may reduce a memory footprint of each such design. Moreover, overall memory usage may be reduced by storing fewer copies (e.g., a single copy) of an image as compared to storing multiple copies of the image (e.g., a copy in each design that uses the image).

In a particular implementation, the web format service 186 may send a first media URL request to the export service 110 requesting a media URL corresponding to the identifier of the media item 141. The export service 110 may, in response to receiving the first media URL request, send a second media URL request to a media service requesting the media URL. The first media URL request, the second media URL request, or both, may indicate a user account associated with the user 104. The first media URL request, the second media URL request, or both, may indicate one or more media characteristics (e.g., a minimum size, a maximum size, a minimum resolution, a maximum resolution, or a combination thereof) supported or requested by the web format service 186. In a particular aspect, the media characteristics may be based on endpoint settings associated with endpoints selected for website publishing.

The media service may provide a second media URL to the export service 110 responsive to receiving the second media URL request. For example, the media database 185 may include multiple versions of the media item 141 that differ from each other in terms of size, resolution, watermarking, or a combination thereof. The media service may select a specific version of the media item 141 that is available (e.g., has been purchased) for the user account of the user 104, that satisfies the media characteristics indicated by the second media URL request, or a combination thereof. The export service 110 may provide a media URL 165 to the web format service 186.

In a particular aspect, the media URL 165 may be the same as the second media URL. In an alternative aspect, the media URL 165 may be a time-limited version of the second media URL. For example, the export service 110 may determine, at a first time, an expiration time based on an URL validity duration (e.g., expiration time=first time+URL validity duration). The export service 110 may generate and provide the media URL 165 to the media service, indicating that the media URL 165 is to refer to the same version of the media item 141 as the second media URL and that the media URL 165 will expire at the expiration time. The media service may determine, based on whether the media URL 165 has expired, whether to provide the version of the media item 141 in response to receiving a request indicating the media URL 165. The web format service 186 may generate the web output 181 including an HTML element (e.g., an HTML tag) for the media item 141. For example, the HTML element may be an image tag and may include the media URL 165 (e.g., <img src=media URL 165>).

As explained above, the web output 181 may include various versions of the website such as a version generated for presentation on larger/landscape display devices and a version generated for presentation on smaller/portrait display devices. Additional versions may also be generated (e.g., for wearable devices having display screens, augmented reality displays, virtual reality displays, etc.). The versions of the website may differ with respect to resolution, aspect ratio, whether particular text/image content is present, placement of particular text/image content, etc. In particular aspects, the various versions of the website may be generated automatically. For example, the web format service 186 may execute a rules engine that indicates mobile telephone content should be no larger than a particular resolution, images should be cropped so as to preserve the image center, fonts should be at least (or no more than) a particular size, menus including more than a particular number of items should be collapsed into sub-menus, etc. The rules engine may also specify preferred file formats for images, animations, videos, etc. for each version of the website.

When generation of the web output 181 is complete, the web format service 186 may provide the web output 181 (or an identifier that can be used to access the web output 181) to the export service 110, the client device 192, selected endpoint(s), or any combination thereof. The web output 181 may include the media item 141 or a link to the media item 141. In some aspects, a version of the media item 141 may be stored by the web format service 186 (e.g., so that website accesses do not result in retrievals from the same database that is used for regular operations of the graphic design website). In a particular aspect, the export service 110 may store data regarding the generated website in an export database. Such data may include one or more of the web output 181, an identifier of the web output 181, a version of the media item 141, media URL(s) 165, etc. The export service 110 may provide, on request, information from the export database to a requesting device, such as the client device 192, an endpoint, etc.

In a particular aspect, the web format service 186 (or the export service 110) may provide endpoint settings to various endpoints. The endpoint settings may include authorization data, such as a username, a password, an authentication token, etc. The web format service 186 (or the export service 110) may provide the authorization data to the endpoint along with the web output 181. The authorization data may enable the endpoint to perform various operations, including but not limited to accessing a website generated based on the design 103.

In a particular aspect, the web format service 186 generates a rendered output (e.g., a render tree or a painted render tree) by rendering the web output 181, or a portion thereof, based on browser information of a browser used by the client device 192. In a particular example, the user request 111 includes the browser information. The web format service 186 generates the image output 153 corresponding to the rendered output. The browser information may indicate a browser type, a browser version, a HTML rendering engine type, a HTML rendering engine version, information regarding a computing device executing the browser, or a combination thereof. The web format service 186 may generate the rendered output by rendering the web output 181 using a HTML rendering engine of the HTML rendering engine type, the HTML rendering engine version, or both, of a browser corresponding to the browser type, the browser version, or both. The rendered output may indicate how the web output 181 is to be displayed at a display device. The web format service 186 may generate the image output 153 based on the rendered output. The image output 153 may represent an image of the web output 181 as rendered by the HTML rendering engine, as displayed by the browser, or both. The web format service 186 may store the image output 153 in the export database.

It will be appreciated that the web format service 186 may overcome issues that may arise due to inconsistencies in browser software, plug-in software, device displays, etc. To illustrate, the design 103 may look slightly different when displayed on different client device makes/models, different browser types or versions, different operating system types or versions, different browser plug-in (or other software) types or versions, etc. However, when the user 104 requests publication of the design 103 from the client device 192, the system 100 may assume that the user 104 expects the published version(s) of the design 103 to look identical to what the user sees at the client device 192. By generating publishing output using rendering engine(s) that are selected and/or instantiated in view of the browser information of the client device 192, the system 100 may establish the same (or as close as possible) client computing environment to the one in which the user 104 sees when requesting publication of the design 103. Doing so may mitigate design rendering issues stemming from hardware/software inconsistencies in different client computing environments. Were the browser information not used, the generated website(s) may differ in some or many ways from what the user sees on their computing device and what the user saw when creating the design and electing to publish the design to various website types. The techniques of the present disclosure advantageously override such behavior. In a particular aspect, rendering engine(s) executed at the computing environment correspond to headless browser instance(s), i.e., "behind-the-scenes" browser instance(s) used to retrieve, render, or provide input to webpages without display of a GUI. Multiple such headless rendering engines may be in operation at a given time in a system that receives multiple concurrent publish requests from different browsers (e.g., being operated by different users).

In a particular aspect, the image output 153 may include multiple images. For example, the image output 153 may include a first image corresponding to a first design page of the design pages 161 (or a first webpage of the webpages 163), a second image corresponding to a second design page of the design pages 161 (or a second webpage of the webpages 163), etc. The image output 153 may include the one or more media items indicated by the web output 181. Alternatively, multiple design pages may be tiled in a single image file.

In some examples, the design 103 includes one or more media items that have an associated publishing cost. When the user 104 clicks the "Purchase Images and Publish" button, the export service 110 may send a request to a billing service of the computing environment to charge an account of the user 104 for the publishing cost of the one or more media items included in the design 103. After payment is verified, format services may generate the web output 181 as described above.

Once versions of the website have been generated, the export service 110 may automatically upload website content (e.g., the web output 181) to particular web servers. The web servers may be part of the computing environment or may be external to the computing environment. In a particular aspect, the export service 110 automatically uploads the web output 181 to a webserver associated with a custom domain (e.g., kbsummit.com). The web output 181 may also be saved in the export database and/or sent to the client device 192.

When the endpoint ID(s) 117 identify multiple endpoints, the export service 110 may send the web output 181 to each identified endpoint. Multiple endpoints may thus access the same copy of the web output 181 or other publishing output. Generating and/or storing a single copy of publishing output may conserve memory resources as compared to storing multiple copies of publishing output (e.g., one copy for each endpoint or each time the output is requested). In some aspects, publishing output that is sent to a client device (e.g., the client device 192) is sent as a compressed package or file.

The system 100 may support publishing of designs that are free of cost as well as publishing of designs that include media items having a publishing cost. The GUI may indicate a cost of publishing the design 103. To illustrate, a first media item (e.g., a foreground or background image or font) that is used in the design 103 may have a one-time cost of $1.00, after which the first media item can be used in unlimited fashion by the user 104. A second media item (e.g., another foreground or background image or font) may have a per-use cost of $0.50. In this example, if the design 103 is published to N endpoints (where N is an integer greater than zero), the publication cost of the design 103 would be at least $1.00+(N*$0.50).

The export service 110 may send a request to a billing service of the computing environment to charge an account of the user 104 for the publishing cost(s) of media item(s) included in the design 103. In a particular example, the GUI may include options to enter payment information. The client device 192 may send the payment information to the billing service for payment of the publishing cost of the design 103.

The system 100 may thus enable using a single design (e.g., the design 103) to generate various types of websites having a similar look-and-feel, including using rendering engine(s) to replicate the look-and-feel seen by the user 104 at the client device 192 from which a publishing request is received. A single update to the design 103 may thus effect a one-to-many change for the multiple types of websites. The one-to-many change significantly reduces effort as compared to updating individual designs for each type of website. A memory footprint of the design 103 may be reduced by having the design 103 include a reference to a media item (e.g., an image) stored in the media database 185 (as compared to including the media item itself). In a particular aspect, use of memory resources (e.g., redundancy) may be reduced by having multiple designs corresponding to multiple users referring to the same copy of the media item (as compared to storing multiple copies of the media item in the media database 185). A size of an output corresponding to the design 103 may be reduced by including the reference to the media item (e.g., the image) in the output (as compared to including the media item itself).

Figure 17:
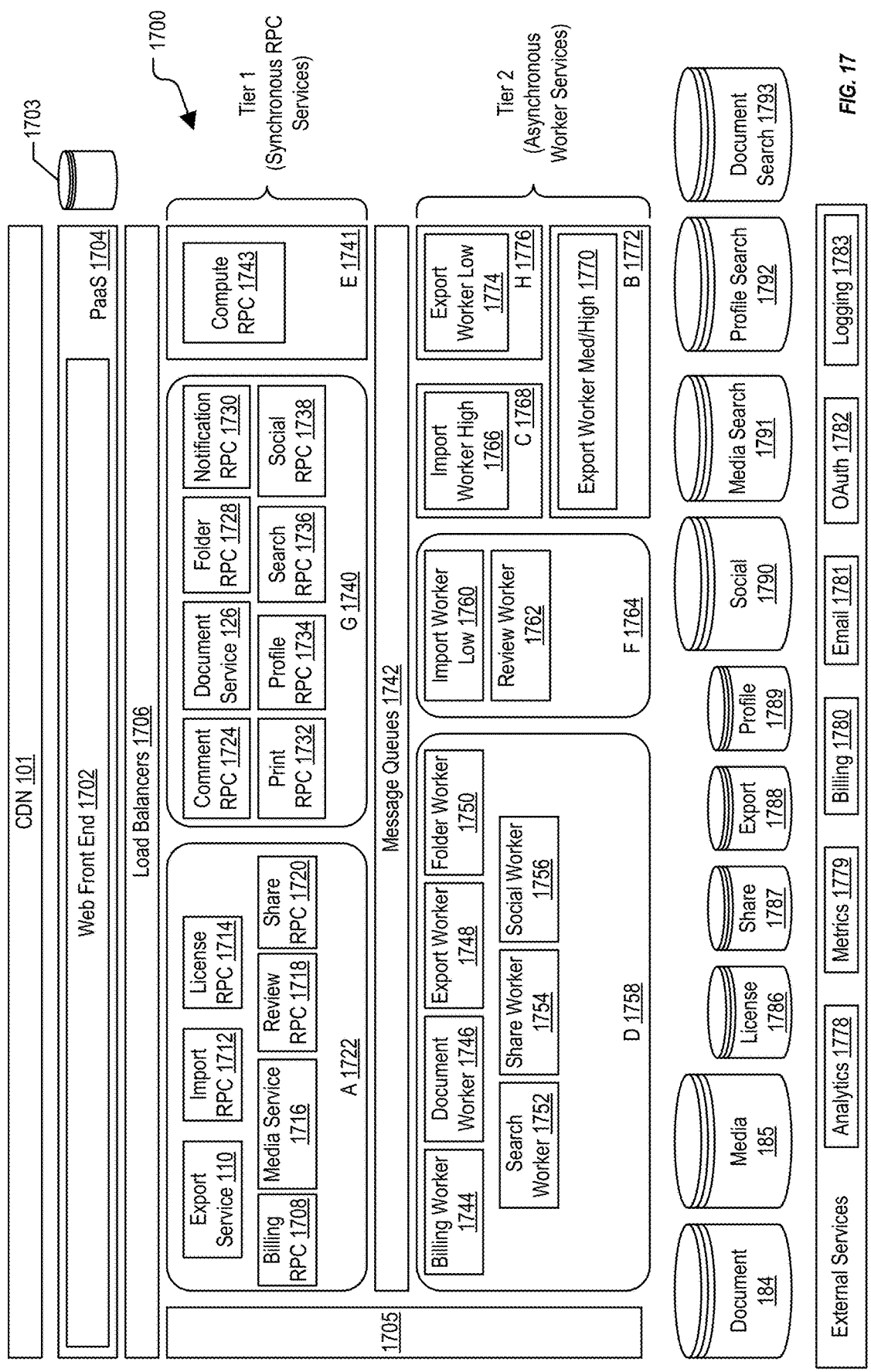
FIG. 17 illustrates another particular example of a system that is operable to generate a website.

Whereas FIG. 1 illustrates an example of a system 100 that is operable to publish a design, it is to be understood that operation of such a system may include various local and/or cloud-based components that are not illustrated in FIG. 1. For example, FIG. 17 depicts, in greater detail, a logical diagram of a system 1700 operable to support aspects of the present disclosure. Although illustrated in a logical diagram, it is to be understood that the various components of the system 1700 may include or may correspond to computer hardware, computer software, or a combination thereof. Moreover, components of the system 1700 may be configured to communicate with each other, for example via wired network(s) and/or wireless network(s). Thus, in various implementations, operations described herein as being performed by a particular component of FIG. 17 may be performed by dedicated hardware, software, or a combination thereof corresponding to the particular component.

In particular aspects, the system 1700 supports browser-based and mobile application-based access to a graphic design website. To illustrate, the graphic design website may correspond to the GUI 205 of FIG. 2, and some or all of the components in the system 1700 may be implemented by the computing environment, one or more servers, the document database 184, the media database 185, the client device 192 of FIG. 1, one or more message queues 1742, load balancers 1706, and/or an export database 1788. For example, users may log in to the graphic design website and create, edit, and save graphic designs. The graphic design website may support operations including, but not limited to, creating a new design, applying a layout to a design, searching for and adding images to a design, saving a design, publishing of a design (as described with reference to the preceding figures), etc.

The system 1700 includes a web front end 1702 executed at a platform as a service (PaaS) provider 1704. The PaaS provider 1704 may enable at-scale deployment of software as a service (SaaS) applications, such as web applications. For example, the web front end 1702 may represent one, five, ten, or some other number of instances of a SaaS application that executes on hardware owned by and/or leased from the PaaS provider 1704. Each such instance of the front end SaaS application may be accessible via the Internet. In some examples, a browser or a mobile application executed by a user's computing device may access the web front end 1702 via the CDN 101. The CDN 101 may also be configured to cache static content (e.g., thumbnails, static images, static web content, etc.). To illustrate, when a user requests a particular content item, such as a particular image, if the CDN 101 (e.g., a server thereof) stores a copy of the image, the CDN may respond to the request without passing the request further into the service infrastructure shown in FIG. 17. The CDN 101 may thus include multiple geographically distributed "edge" servers that cache content.

The web front end 1702 may be configured to serve a graphic design website to requestors, such as by responding to hypertext transfer protocol (HTTP) GET requests, HTTP POST requests, etc. The web front end 1702 may also be configured to respond to application programming interface (API) calls originating from web browsers and/or mobile apps. In some examples, the web front end 1702 may utilize an in-memory cache 1703 that stores session data. To illustrate, when a user logs in to the graphic design website served by the web front end 1702, information regarding the user (e.g., display name, photo, subscription level, e-mail address, etc.) may be stored in the in-memory cache 1703 for rapid retrieval, processing, and/or rendering on some or all of the webpages of the graphic design website. Use of the in-memory cache 1703 may thus enable quickly serving webpages without accessing backend systems to determine user information.

The system 1700 includes the load balancers 1706 configured to support communication and workload distribution from the web front end 1702 to a plurality of backend services or microservices that execute, for example, on one or more virtual machines in a cloud computing environment. Each such virtual machine may be implemented using physical hardware that is owned by and/or leased by a cloud service provider. The system 1700 may support scaled, dynamic deployment of services based on scale groupings in a multi-tiered configuration. In particular aspects, services may be grouped in certain virtual machines based on expected load patterns for the services. The architecture of the system 1700 may enable the reorganization of these groupings with low effort, based on changes in observed load patterns or the introduction of new services. Separating services across multiple virtual machines may also enable scaling specific service groups in response to increases in certain kinds of loads. This scaling may occur automatically based on monitoring of load, and may also be triggered manually in anticipation of load increases. To illustrate, if an increasing number of export tasks (e.g., publish tasks) are observed (e.g., based on percentage of busy vs. idle time), more virtual machines that include instances of the export service 110 and/or an export worker 1748 may dynamically be instantiated to service the demand.

Conversely, if an administrator of the system 1700 anticipates export volume (e.g., publish volume) to increase, the administrator may manually initialize additional virtual machines that include instances of the export service 110 and/or the export worker 1748. When export volume decreases, the virtual machines may be automatically (e.g., based on percentage of busy vs. idle time) or manually scaled down.

In the example of FIG. 17, a first tier of services includes synchronous "request-response" remote procedure call (RPC) services and a second tier includes asynchronous "worker" services. A synchronous RPC service may receive first data from a requestor, perform one or more processing functions, and return second data to the requestor. Such synchronous request-response services may be used for tasks that can be completed relatively quickly, e.g., in three seconds or less, because in some examples a requestor (e.g., a web browser or mobile app) may block while waiting for a response. Conversely, the asynchronous worker services of the second tier may be used for background tasks and other tasks that cannot or may not be completed relatively quickly.

In FIG. 17, the first tier includes a first scale group 1722 (designated "A"), a second scale group 1740 (designated "G"), and a third scale group 1741 (designated "E"). The first scale group 1722 includes a billing RPC service 1708, the export service 110, an import RPC service 1712, a license RPC service 1714, a media service 1716, a review RPC service 1718, and a share RPC service 1720. To illustrate, a virtual machine corresponding to the first scale group 1722 may execute the illustrated RPC services. The billing RPC service 1708 may be configured to perform synchronous billing tasks (e.g., checking account balance). The export service 110 may be used to perform synchronous graphic design export tasks (e.g., publishing a design). The import RPC service 1712 may be configured to enable user importing of media assets for use in graphic design creation/editing. The license RPC service 1714 may be configured to enforce image licenses (e.g., one-time-use licenses). The media service 1716 may be configured to track and catalog media assets available via the system 1700, including but not limited to user-uploaded and/or library images, layouts, fonts, etc. The review RPC service 1718 may be configured to facilitate acceptance of contributor media (e.g., uploading of media assets by authorized contributors of the graphic design website). The share RPC service 1720 may enable sharing of graphic designs with other users, such as via social media accounts.

The second scale group 1740 includes a comment RPC service 1724, the document service 126, a folder RPC service 1728, a notification RPC service 1730, a print RPC service 1732, a profile RPC service 1734, a search RPC service 1736, and a social RPC service 1738. The comment RPC service 1724 may enable users to comment on graphic designs in comment threads. The document service 126 may enable core design creation, design updating, and design deletion functionality of the graphic design website. The folder RPC service 1728 may enable navigating into and out of different folders associated with a user's account. The notification RPC service 1730 may enable generating and serving notifications to users via the graphic design website (e.g., when a user's design is "liked" or commented on). In some aspects, multiple such notifications may be coalesced into an e-mail that is sent to an e-mail address of the user or that is shown on a pop-up when the user accesses the graphic design website. The print RPC service 1732 may be a format service that enables sending a graphic design to a third-party printer, for example to be printed and then delivered to a physical mailing address of the user. The profile RPC service 1734 may enable users to manage their graphic design website account. The search RPC service 1736 may enable searching for images, layouts, designs, etc. The social RPC service 1738 may enable users to perform social networking engagement on the graphic design website (e.g., "follow" another user, "like" another user's design, etc.) and may generate "feeds" of designs created by followed users. The third scale group 1741 includes a compute RPC service 1743 that may be dedicated for performing certain fast high-CPU-utilization operations, such as hashing and solving of passwords.

The second tier of services in FIG. 17 includes a fourth scale group 1758 (designated "D"), a fifth scale group 1764 (designated "F"), a sixth scale group 1768 (designated "C"), a seventh scale group 1776 (designated "H"), and an eighth scale group 1772 (designated "B"). The fourth scale group 1758 includes a billing worker 1744, a document worker 1746, an export worker 1748, a folder worker 1750, a search worker 1752, a share worker 1754, and a social worker 1756. The fifth scale group 1764 includes a low priority import worker 1760 and a review worker 1762. The sixth scale group 1768 includes a high priority import worker 1766. The seventh scale group 1776 includes a low priority export worker 1774. The eighth scale group 1772 includes a medium/high priority export worker 1770. In illustrative aspects, the asynchronous worker services in FIG. 17 may perform longer and/or more complex versions of the operations performed by the corresponding RPC services of FIG.

17. In a particular implementation, the priority designations shown in FIG. 17 (e.g., "low," "medium," and "high") correspond to an amount of dedicated processing resources. "High" priority may be used for jobs that are triggered by user actions whereas "medium" or "low" priority may be used for jobs that are not triggered by user actions (e.g., background jobs).

It is to be understood that the various services and groupings thereof shown in FIG. 17 is for illustration only and is not to be considered limiting. In alternative aspects, more, fewer, and/or different services may be present in the system. Moreover, a different grouping of services into different scale groups than shown in FIG. 17 may be used. In some aspects, each of the scale groups shown in FIG. 17 corresponds to a virtual hardware instance, i.e., a virtual machine running at a cloud services provider. Thus, at any given time, there may be one or more active/executing instances of each of the scale groups, and the specific numbers of active/executing virtual machine instances may dynamically change based on the overall workload being managed by the load balancers 1706. Coordination and configuration of the various instances, including communication between instances and/or services executed therein, may be managed by a coordination tool 1705, which may itself be a cloud-based system.

During operation, the synchronous RPC services of the first tier may be configured to communicate with the asynchronous workers' services of the second tier via the message queues 1742 and may utilize the asynchronous workers to perform time-consuming tasks. For example, the export service 110 may receive a request that a user wants to export a graphical design to a PDF format. The export service 110 may push a corresponding work request into the message queues 1742. An export worker (e.g., the medium/high priority export worker 1770) may respond to the work request by rendering the graphical design to PDF. The PDF or (a link to the PDF stored in a cloud storage system) may then be passed back to the requesting user. An export worker may correspond to a format service. For example, an export worker may include the web format service 186 of FIG. 1, one or more additional format services, or a combination thereof. As another example, the folder RPC service 1728 may receive a request indicating that a user wants to share a folder of graphic designs with another user. The folder RPC service 1728 may use the message queues 1742 to request that the folder worker 1750 set the corresponding permissions on the folder and on each of the items in that folder. As yet another example, asynchronous workers may be used to perform routine background tasks in the system 1700, such as daily verification of subscription levels.

During certain operations at the system 1700, the illustrated services may access one or more databases or data stores. For example, the document database 184 may store files corresponding to user-created graphic designs and the media database 185 may store image uploads, fonts, and layouts that are accessible via the graphic design website. In an illustrative aspect, the document database 184 may be accessed by the document worker 1746 when a user opens or saves a graphic design. In another illustrative aspect, the media database 185 may be accessed by the media service 1716 when a user uploads or retrieves an image, a layout, or a font.

The system 1700 may also include one or more of a license database 1786, a share database 1787, the export database 1788, a profile database 1789, or a social database 1790. The license database 1786 may be used by the license RPC service 1714 to track licenses (e.g., one-time-use licenses for images) that have been acquired by a user. The share database 1787 may be used by the share RPC service 1720 or the share worker 1754 to manage sharing of graphic designs with other users (e.g., via social network(s)). The export database 1788 may be used by the export service 110, the export worker 1748, the low priority export worker 1774, or the medium/high priority export worker 1770 to track user exports of their graphic designs into different output formats. The profile database 1789 may support searching for user profiles based on different criteria. The social database 1790 may support social media aspects of the graphic design website.

The system 1700 may also include databases or data stores that support search functionality. For example, a media search database 1791 may be accessed by the search RPC service 1736 or the search worker 1752 when a user searches for images, layouts, or fonts. As another example, a profile search database 1792 may be accessed by the profile RPC service 1734 when a user edits the profile information associated with their account. As yet another example, a document search database 1793 may be accessed by the document worker 1746 when a user searches for a previously saved graphic design.

Certain operations at the system 1700 may involve accessing "external" services that are not part of the core service oriented platform of the graphic design website. Examples of such external services may include, but are not limited to, an analytics service 1778, a metrics service 1779, a billing service 1780, an e-mail service 1781, an open authorization (OAuth) service 1782, or a logging service 1783. The analytics service 1778 may receive analytics events (e.g., messages) each time a user performs an action on the graphic design website, and may enable per-user and macro level analytics of graphic design website workflow, operations, and performance. The metrics service 1779 may collect and provide performance information regarding the various components of the system 1700. The billing service 1780 may interface to one or more external payment providers, such as for credit card processing, mobile payment processing, etc. The e-mail service 1781 may enable generating and/or sending e-mails to users (e.g., for notifications, password reset, etc.). The OAuth service 1782 may enable federated logins to the graphic design website using social network credentials and may also support authentication with certain publish endpoints. The logging service 1783 may index events/messages that are generated by the components of the system 1700 for later diagnostic searching.

One example of an operation that may be supported by the system 1700 is logging in to the graphic design website via an Internet browser or a mobile app. A login request may be received by the web front end 1702 from the Internet browser or mobile app. The login request may be routed by the load balancers 1706 to an instance of the profile RPC service 1734, which may "look up" the user in the profile database 1789 and may authenticate the user (federated social networking login may involve the OAuth service 1782). Once the user is authenticated, the graphic design website may load a custom homepage for the user, which may include operations being performed by an instance of the folder RPC service 1728, the document worker 1746, etc. The custom homepage may then be returned to the user's Internet browser or mobile app.

Another example of an operation that may be supported by the system 1700 is starting a new design or opening an existing design. When a user clicks on a new design template, the web front end 1702 may provide the user's Internet browser or mobile application a graphical design interface (e.g., HTML code) that is executable to edit the new or existing design. In the case of loading an existing design, the document service 126 and/or the document worker 1746 may access the document database 184 to retrieve the existing design, and the media service 1716 may load media assets that are included in the design from the media database 185.

Another example of an operation that may be supported by the system 1700 is when a user updates a design using the graphical design interface served by the graphic design website. As the user updates the design, the updates may be processed by the document service 126 and/or the document worker 1746. For example, the service(s) may process image or text movement, insertion, deletion, resizing, recoloring, etc.

Another example of an operation that may be supported by the system 1700 is when a user imports an image. In this case, the import RPC service 1712 and/or one of the import workers 1760, 1766 may receive a user-uploaded image, process the image, and integrate the image into the media database 185 for subsequent retrieval by the media service 1716.

Another example of an operation that may be supported by the system 1700 is when a user applies a layout to a design. In this case, the media search database 1791 may provide via the media service 1716, media assets corresponding to the layout. The insertion of the media assets into the design may then be processed by the document service 126 and/or the document worker 1746 as an update to the user's design.

Another example of an operation that may be supported by the system 1700 is when a user searches for a media asset and then drags-and-drops the media asset into a design. For example, when a user enters a search query "dog," the search RPC service 1736 and/or the search worker 1752 may access the media search database 1791 to retrieve search results for "dog." The search results may be presented by the user's Internet browser or mobile app. When the user adds a particular search result, e.g., a particular image of a dog, to their design, the document service 126 or the document worker 1746 may process the corresponding update to the design.

Figure 18:
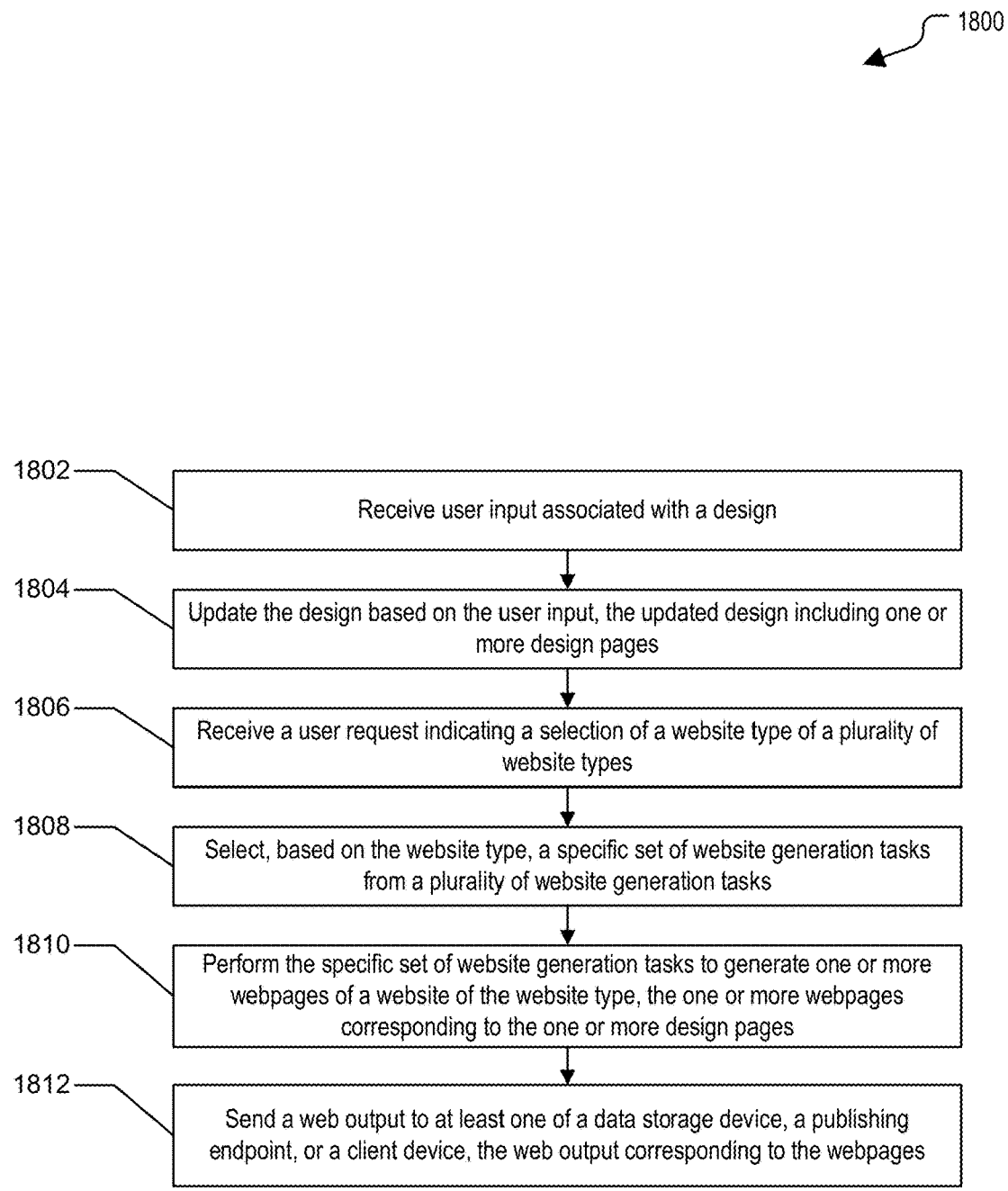
FIG. 18 illustrates a particular example of a method of generating a website.

In a particular aspect, the system 1700 may support publishing of a design as a website. For example, a user may select a particular website type to publish a design, as described with reference to the preceding FIGS. In some aspects, component(s) of the system 1700 (and/or the system 100) may perform a method 1800 of FIG. 18 to publish a design as a website of the selected website type.

The method 1800 includes receiving user input associated with a design, at 1802. For example, the web front end 1702 executed by a first server may generate a GUI that includes enables editing of the design 103 of FIG. 1. The first server, the web front end 1702, and/or the CDN 101, may send the GUI to the client device 192. As a user updates the design 103, the client device 192 sends the user input 109 to the web front end 1702.

The method 1800 also includes updating the design based on the user input, at 1804. For example, the document service 126 may save the edits indicated by the user input 109 to the design 103. The updated version of the design 103 includes the one or more design pages 161.

The method 1800 further includes receiving a user request indicating a selection of a website type of a plurality of website types, at 1806. For example, the web front end 1702 generates the GUI 205 of FIG. 2 including a plurality of options corresponding to the website types 175. The first server, the web front end 1702, and/or the CDN 101, sends the GUI 205 to the client device 192. A user selects the website type 177 and selects the publish option 207. The client device 192 sends the user request 111 indicating at least the website type 177.

The method 1800 also includes selecting, based on the website type, a specific set of website generation tasks from a plurality of website generation tasks, at 1808. For example, the web format service 186 selects, based on the website type 177, the selected tasks 173 from the tasks 171 (e.g., website generation tasks). To illustrate, as described above with reference to FIGS. 4-15, different tasks may be selected for execution in different orders depending on whether the user wishes to publish the design to a classic/scroll/presentation/standard website. Thus, based on the type of website that is selected, an "execution pipeline" of tasks may be determined, where some tasks may be capable of being performed concurrently while other tasks may have dependencies and therefore may be performed one after the other. Depending on the tasks selected and system load, additional instances of certain services may be instantiated.

The method 1800 further includes performing the specific set of website generation tasks to generate one or more webpages of a website having the website type, at 1810. For example, the web format service 186 may perform, or cause to be performed, the selected tasks 173 to generate the one or more webpages 163, as described with respect to FIGS. 4-16.

The method 1800 also includes sending a web output to at least one of a data storage device, a publishing endpoint, or a client device, at 1812. For example, the web format service 186 may send the web output 181 to at least one of the export database 1788, the endpoint 172, the endpoint 174 (e.g., a publishing endpoint), or the client device 192.

In some examples, after one or more websites have been published from an underlying design, a user may make a modification to the design, such as adding an image/text, deleting an image/text, replacing an image/text, editing an attribute of an image/text, etc. The modification may automatically be detected and website generation tasks may automatically be triggered to generate updated web outputs that reflect the modification. The updated web outputs, which may include updated webpages, updated HTML code, updated web scripting code, updated media assets, etc., be sent to web server(s) hosting the earlier-published websites so that the websites reflect the most recent modification made by the user.

The method 1800 may thus enable publishing a design (e.g., the design 103) as various types of websites having the same or similar content with different look-and-feel options. Individual designs for each type of website may not need to be generated or maintained. Rather, a single modification to the design 103 may effect a one-to-many change for the multiple types of websites. The change may be effected when the user republishes the website. Alternatively, information associating the design 103 and the websites based on the design may be stored, so that when the design 103 is updated, the updates can automatically be translated to corresponding web output and propagated to the websites.

Methods and devices that may implement aspect(s) of the various features of the present disclosure have been described with reference to the drawings. The drawings and the associated descriptions are provided to illustrate aspects and not to limit the scope of the present disclosure. Reference to any specific aspect, aspect, or implementation is intended to indicate that a particular feature, structure, or characteristic described in connection therewith is included in at least an aspect, aspect, or implementation of the present disclosure. However, the various uses of the terms "aspect," "aspect," "implementation," "example," and "embodiment" are not necessarily all referring to the same single aspect, aspect, implementation, example, or embodiment.

In a particular aspect, an apparatus includes an input interface, a processor, and a transmitter. The input interface is configured to receive user input associated with a design. The input interface is also configured to receive a user request indicating a selection of a website type of a plurality of website types. The processor is configured to update the design based on the user input. The updated design includes one or more design pages. The processor is also configured to select, based on the website type, a specific set of website generation tasks from a plurality of website generation tasks. The processor is further configured to perform the specific set of website generation tasks to generate one or more webpages of a website of the website type. The one or more webpages correspond to the one or more design pages. The transmitter is configured to send a web output to at least one of a data storage device, a publishing endpoint, or a client device. The web output corresponds to the webpages.

In another particular aspect, a method includes receiving user input associated with a design. The method also includes updating the design based on the user input. The updated design includes one or more design pages. The method further includes receiving a user request indicating a selection of a website type of a plurality of website types. The method also includes selecting, based on the website type, a specific set of website generation tasks from a plurality of website generation tasks. The method further includes performing the specific set of website generation tasks to generate one or more webpages of a website of the website type. The one or more webpages correspond to the one or more design pages. The method also includes sending a web output to at least one of a data storage device, a publishing endpoint, or a client device. The web output corresponds to the webpages.

In another particular aspect, a computer-readable storage device stores instructions that, when executed by a processor, cause the processor to perform operations including receiving user input associated with a design. The operations also include updating the design based on the user input. The updated design includes one or more design pages. The operations further include receiving a user request indicating a selection of a website type of a plurality of website types. The operations also include selecting, based on the website type, a specific set of website generation tasks from a plurality of website generation tasks. The operations further include performing the specific set of website generation tasks to generate one or more webpages of a website of the website type. The one or more webpages correspond to the one or more design pages. The operations also include sending a web output to at least one of a data storage device, a publishing endpoint, or a client device, the web output corresponding to the webpages.

In the foregoing description, specific details are given to provide a thorough understanding of the present disclosure. However, it will be understood by one of ordinary skill in the art that the present disclosure can be practiced without these specific details. Well-known structures and techniques may not be shown in detail, in order to avoid obscuring the illustrated aspects. For example, algorithms may be shown in block diagrams.

It is noted that aspects may be described as a process that is depicted as a flowchart, a flow diagram, a structure diagram, or a block diagram. Although a flowchart may describe operations as a sequential process, many of the operations can be performed in parallel or at least partially concurrently. In addition, the order of the operations can be rearranged. A process is terminated when its operations are completed. A process can correspond to a method, a function, a procedure, a subroutine, a subprogram, etc. When a process corresponds to a function, its termination corresponds to a return of the function to the calling function or the main function.

Moreover, storage may represent one or more devices that store data, including but not limited to random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a flash memory device, and/or other computer-readable or processor-readable media to store information. As used herein, a computer-readable or processor-readable storage medium/device is not a signal.

Furthermore, aspects can be implemented by hardware, software, firmware, middleware, microcode, or any combination thereof. When implemented in software, firmware, middleware or microcode, program code or code segments to perform the tasks can be stored in a memory or other storage. One or more than one processor can perform tasks in series, distributed, concurrently, or in parallel. In some examples, a virtual computer system can be constructed to implement one or more of the methods or functionality as described herein. A code segment can represent a procedure, a function, a subprogram, a program, a routine, a subroutine, a module, a software package, a class, or a combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted through a suitable means including memory sharing, message passing, token passing, network transmission, etc.

Although the present disclosure has been described with a degree of particularity, it is understood that the present disclosure has been made by way of example and that other versions are possible. As various changes could be made in the above description without departing from the scope of the disclosure, it is intended that all matter contained in the above description or shown in the accompanying drawings shall be illustrative and not used in a limiting sense.

All features disclosed in the specification, including the claims, abstract, and drawings, and all the steps in any method or process disclosed, can be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise.

Thus, unless expressly stated otherwise, each feature disclosed is one example only of a generic series of equivalent or similar features. The above-disclosed subject matter is to be considered illustrative, and not restrictive, and the appended claims are intended to cover all such modifications, enhancements, and other aspects, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing description.

What is claimed is:

1. An apparatus comprising:
an input interface configured to:
receive user input associated with a design document; and
receive a user request indicating a selection of a website type of a plurality of website types;
a processor associated with a web format service and configured to:
update a layout of images, colors and/or fonts of the design document based on the user input to produce an updated design document, the updated design document including a plurality of design pages each including one or more designs, comprising at least one design page including one or more designs with the updated layout of images, colors and/or fonts;
cause a user display to display the one or more designs on a display device;
select, based on the website type, a specific set of website generation tasks from a plurality of website generation tasks, wherein the specific set of website generation tasks comprise generating, based on the updated design document, at least one of:
a navigation menu or navigation element for navigating designs of the plurality of design pages;
a separate webpage for each respective page of the design document; and
a single webpage including content corresponding to each page of the design document; and
perform the specific set of website generation tasks to generate one or more webpages of a website of the website type, the one or more webpages comprising at least one webpage having a layout corresponding to the updated layout of images, colors and/or fonts of the one or more design pages; and
a transmitter configured to send a web output to at least one of a data storage device, a publishing endpoint, or a client device, the web output corresponding to the one or more webpages.

2. The apparatus of claim 1, wherein the plurality of web site generation tasks includes generating a separate webpage for each respective page of the design document.

3. The apparatus of claim 2, wherein the plurality of web site generation tasks includes the task of generating a navigation menu for navigating designs of the plurality of design pages, the task comprising generating a first navigation menu including navigation menu items corresponding to each of the separate webpages.

4. The apparatus of claim 1, wherein the plurality of web site generation tasks includes generating a single webpage including content corresponding to each page of the design document.

5. The apparatus of claim 4, wherein the plurality of website generation tasks includes generating a second navigation menu including menu items operable to view particular portions of the single webpage, the particular portions corresponding to the design pages.

6. The apparatus of claim 1, wherein the website type includes a classic website type, and wherein a website of the classic website type includes a separate webpage for each page of the design document and a navigation menu operable to navigate between the separate webpages.

7. The apparatus of claim 1, wherein the website type includes a scroll website type, and wherein a website of the scroll website type includes a single webpage including portions for each page of the design document.

8. The apparatus of claim 7, wherein the single webpage is generated to have a parallax scrolling effect.

9. The apparatus of claim 1, wherein the website type includes a presentation website type, and wherein a website of the presentation website type includes a separate webpage for each page of the design document, each webpage having a navigation element that includes at least one of a page number, a previous page control, or a next page control.

10. The apparatus of claim 1, wherein the website type includes a standard website type, and wherein a website of the standard website type includes a single webpage including portions for each page of the design document and a navigation menu a navigation menu operable to navigate between the portions of the single webpage.

11. A method comprising:
receiving, at a processor of a computing device, user input associated with a design document;
updating and displaying to a user a layout of images, colors and/or fonts of the design document based on the user input to produce an updated design document, the updated design document including a plurality of design pages each including one or more designs, comprising at least one design page including one or more designs with the updated layout of images, colors and/or fonts;
receiving a user request indicating a selection of a first website type of a plurality of website types;
selecting, via a processor associated with a web format service and based on the first website type, a first set of website generation tasks from a plurality of website generation tasks, the first set of website generation tasks comprising generating, based on the updated design document, at least one of:
a navigation menu or navigation element for navigating designs of the plurality of design pages;
a separate webpage for each respective page of the design document; and
a single webpage including content corresponding to each page of the design document;
performing the first set of website generation tasks to generate one or more first webpages of a first website of the first website type, the one or more first webpages comprising at least one webpage having a layout corresponding to the updated layout of images, colors and/or fonts of the one or more design pages; and
sending a first web output to at least one of a data storage device, a publishing endpoint, or a client device, the first web output corresponding to the one or more first webpages.

12. The method of claim 11, further comprising:
receiving data indicating a selection of a second website type;
selecting, based on the second website type, a second set of website generation tasks from a plurality of website generation tasks;
performing the second set of website generation tasks to generate one or more second webpages of a second website of the second website type, the one or more second webpages corresponding to the plurality of design pages; and
sending a second web output to at least one of the data storage device, the publishing endpoint, or the client device, the second web output corresponding to the one or more second webpages;

wherein one of the first set of website generation tasks and the second set of website generation tasks includes generating a separate webpage for each respective page of the design document and the other includes generating single webpage including content corresponding to each page of the design document.

13. The method of claim 12, wherein the first set and the second set have at least one website generation task in common.

14. The method of claim 12, wherein the first set includes at least one web site generation task that is not included in the second set.

15. The method of claim 12, wherein the data is included in the user request and wherein the first website and the second website are generated at least partially concurrently.

16. The method of claim 12, further comprising, after sending the first web output and the second web output:
   detecting a modification to the design document; and
   in response to detecting the modification, automatically generating and sending first updated web output for the first website to reflect the modification and second updated web output for the second website to reflect the modification.

17. A computer-readable storage device storing instructions that, when executed by a processor, cause the processor associated with a web format service to perform operations comprising:
   receiving user input associated with a design document;
   updating a layout of images, colors and/or fonts of the design document based on the user input to produce an updated design document, the updated design document including a plurality of design pages each including one or more designs, comprising at least one design page including one or more designs with the updated layout of images, colors and/or fonts;
   receiving a user request indicating a selection of a website type of a plurality of website types;
   selecting, based on the website type, a specific set of website generation tasks from a plurality of website generation tasks, the first set of website generation tasks comprising generating, based on the updated design document, at least one of:
      a navigation menu or navigation element for navigating designs of the plurality of design pages;
      a separate webpage for each respective page of the design document; and
      a single webpage including content corresponding to each page of the design document;
   performing the specific set of website generation tasks to generate one or more webpages of a website of the website type, the one or more webpages comprising at least one webpage having a layout corresponding to the updated layout of images, colors and/or fonts of the one or more design pages; and
   sending a web output to at least one of a data storage device, a publishing endpoint, or a client device, the web output corresponding to the one or more webpages.

18. The computer-readable storage device of claim 17, wherein the website types available for selecting includes two or more of a classic website type, a scroll website type, a presentation website type, and a standard website type.

19. The computer-readable storage device of claim 17, wherein the plurality of website generation tasks includes:
   generating a separate webpage for each respective page of the design document; or
   generating a single webpage including content corresponding to each page of the design document.

20. The computer-readable storage device of claim 19, wherein the plurality of website generation tasks includes:
   generating a first navigation menu including navigation menu items corresponding to each of the separate webpages; or
   generating a second navigation menu including menu items operable to view particular portions of the single webpage.

21. The apparatus of claim 1, wherein the plurality of design pages are represented by one or more first key-value pairs or n-tuples in the design document, wherein the processor associated with the web format service is further configured to generate the one or more webpages of the website of the website type by converting the one or more first key-value pairs or n-tuples to web elements corresponding to a web format.

22. The method of claim 11, wherein the plurality of design pages are represented by one or more first key-value pairs or n-tuples in the design document, wherein performing the first set of website generation tasks to generate the one or more first webpages of the first website of the first website type comprises converting the one or more first key-value pairs or n-tuples to web elements corresponding to a web format.

23. The computer-readable storage device of claim 17, wherein the plurality of design pages are represented by one or more first key-value pairs or n-tuples in the design document, wherein performing the first set of website generation tasks to generate the one or more first webpages of the first website of the first website type comprises converting the one or more first key-value pairs or n-tuples to web elements corresponding to a web format.

* * * * *

UNITED STATES PATENT AND TRADEMARK OFFICE
CERTIFICATE OF CORRECTION

PATENT NO. : 11,507,731 B2  
APPLICATION NO. : 16/393860  
DATED : November 22, 2022  
INVENTOR(S) : Matthew Carter et al.

Page 1 of 1

It is certified that error appears in the above-identified patent and that said Letters Patent is hereby corrected as shown below:

On the Title Page

Item (72), should read:  
Matthew Carter, Wollstonecraft (AU);  
Cameron Adams, Rozelle (AU);  
Evgenii Datskii, Cammeray (AU);  
Tomasz Modrzynski, Zetland (AU);  
Georgia Vidler, Bondi Beach (AU)

Signed and Sealed this  
Twenty-sixth Day of August, 2025

Coke Morgan Stewart  
*Acting Director of the United States Patent and Trademark Office*